(12) United States Patent
Destain

(10) Patent No.: US 7,959,305 B2
(45) Date of Patent: Jun. 14, 2011

(54) LIGHT RECYCLING IN A MICROMIRROR-BASED PROJECTION DISPLAY SYSTEM

(75) Inventor: Patrick R. Destain, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 600 days.

(21) Appl. No.: 11/847,685

(22) Filed: Aug. 30, 2007

(65) Prior Publication Data
US 2009/0009730 A1    Jan. 8, 2009

Related U.S. Application Data

(60) Provisional application No. 60/947,645, filed on Jul. 2, 2007.

(51) Int. Cl.
*G03B 21/28* (2006.01)
(52) U.S. Cl. .............. 353/99; 353/30; 353/31; 353/77; 353/79; 353/98; 353/84; 353/119; 353/122; 359/726; 359/872; 359/385; 359/237; 359/223.1; 359/225.1; 359/224.1; 348/742; 348/743; 348/744; 348/771; 372/9; 372/20; 372/23; 372/29; 362/551; 362/553; 362/555; 362/561; 345/690; 345/691
(58) Field of Classification Search .......... 353/31, 353/84, 98, 122, 30, 77, 79, 99, 119; 348/742, 348/743, 744, 771; 362/551, 555, 553, 561; 372/9, 20, 23, 29; 359/726, 198, 224.1, 226.1, 359/385, 223.1, 872, 225.1
See application file for complete search history.

(56) References Cited

U.S. PATENT DOCUMENTS

| | | | | |
|---|---|---|---|---|
| 5,650,832 | A * | 7/1997 | Poradish et al. | 348/743 |
| 5,796,508 | A * | 8/1998 | Suzuki | 359/224.1 |
| 6,642,969 | B2 | 11/2003 | Tew | |
| 6,771,325 | B1 * | 8/2004 | Dewald et al. | 348/743 |
| 6,779,898 | B2 | 8/2004 | Wang | |
| 6,824,275 | B2 | 11/2004 | Penn | |
| 6,851,811 | B2 * | 2/2005 | Akiyama | 353/31 |
| 7,052,150 | B2 | 5/2006 | Dewald | |

(Continued)

OTHER PUBLICATIONS

"Single-Panel DLP™ Projection System Optics", Application Report: Discovery DLPA002 (Texas Instruments Incorporated, Mar. 2005).

*Primary Examiner* — Georgia Y Epps
*Assistant Examiner* — Sultan Chowdhury
(74) *Attorney, Agent, or Firm* — Charles A. Brill; Wade James Brady, III; Frederick J. Telecky, Jr.

(57) ABSTRACT

A digital micromirror projection display system is disclosed in which "off" pixel light is recaptured and recycled. In the disclosed system, a digital micromirror device directs incident light for "on" pixels in the image to be displayed through projection lenses to a projection screen. The digital micromirror device directs incident light for "off" pixels back toward the light source for recapture by a light integrator. Both the incident and projected light can pass through a rear group of projection lenses, with the first projection lens being disposed near the digital micromirror device. A mirror directs the incident light toward the digital micromirror device, and the "off" pixel light from the digital micromirror device toward the light integrator. As a result, "off" pixel light can be recycled without degrading image contrast, in a manner that can place fast projection lenses close to the digital micromirror device to save cost.

22 Claims, 14 Drawing Sheets

U.S. PATENT DOCUMENTS

| | | |
|---|---|---|
| 7,088,321 B1 * | 8/2006 | Parker ................................ 345/83 |
| 7,118,226 B2 | 10/2006 | Davis et al. |
| 7,161,608 B2 * | 1/2007 | Pettitt et al. ................... 345/690 |
| 7,184,213 B2 | 2/2007 | Dewald |
| 7,755,650 B2 * | 7/2010 | Bell et al. ....................... 345/691 |
| 7,832,870 B2 * | 11/2010 | Pettitt et al. ...................... 353/37 |
| 2005/0105061 A1 | 5/2005 | Delong |
| 2005/0270501 A1 | 12/2005 | Yoshida |
| 2006/0044518 A1 * | 3/2006 | Allen et al. ....................... 353/30 |
| 2006/0279713 A1 | 12/2006 | Wang et al. |
| 2006/0290905 A1 * | 12/2006 | May ................................ 353/122 |
| 2007/0058143 A1 | 3/2007 | Penn et al. |
| 2007/0103644 A1 | 5/2007 | Nakamura et al. |
| 2007/0127106 A1 * | 6/2007 | Dewald et al. ................ 359/237 |
| 2007/0165189 A1 * | 7/2007 | Kawase et al. ................... 353/31 |

* cited by examiner

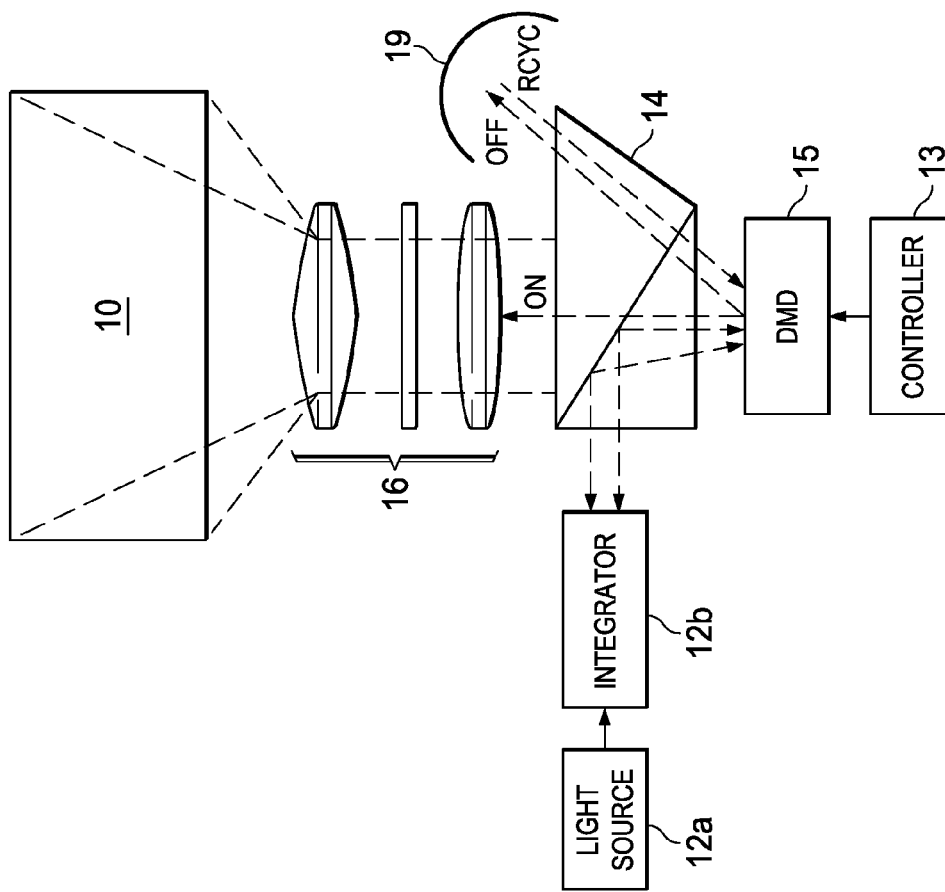
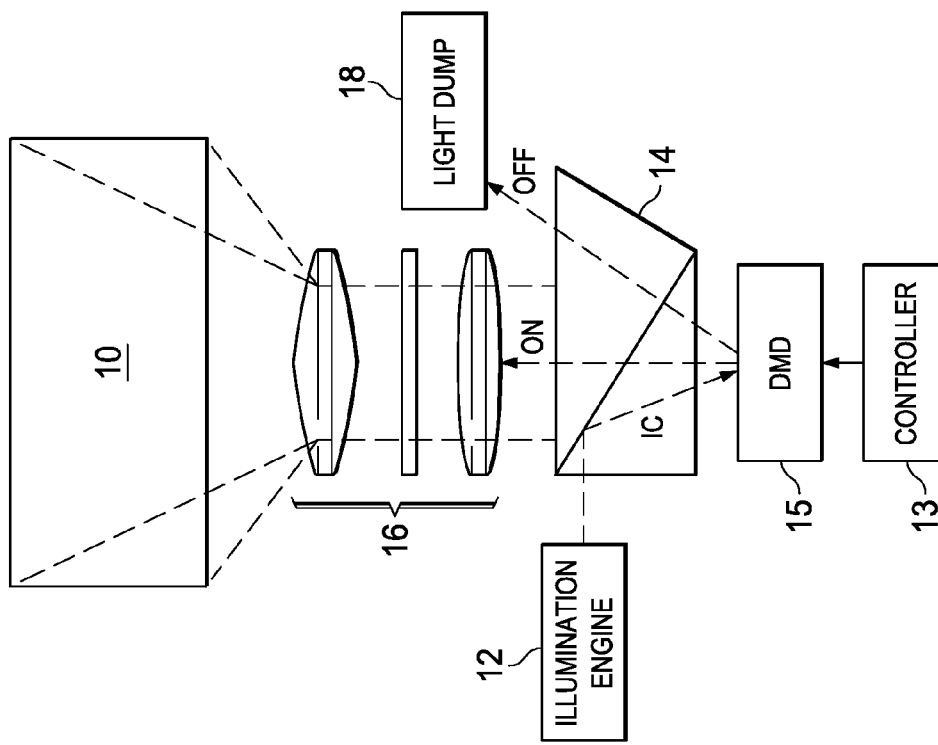

LIGHT RECYCLING IN A MICROMIRROR-BASED PROJECTION DISPLAY SYSTEM

CROSS-REFERENCE TO RELATED APPLICATIONS

This application claims priority, under 35 U.S.C. §119(e), of Provisional Application No. 60/947,645, filed Jul. 2, 2007, incorporated herein by this reference.

STATEMENT REGARDING FEDERALLY SPONSORED RESEARCH OR DEVELOPMENT

Not applicable.

BACKGROUND OF THE INVENTION

This invention is in the field of projection display systems, and is more specifically directed to the recovery of reflected light in a digital micromirror device display system.

As is evident from a visit to a modern electronics store, the number of flat-panel (i.e., non-CRT) televisions has vastly increased in recent years, while the purchase price for such sets continues to fall. This tremendous competition is due in large part to the competing technologies for the display of high-definition television content. As known in the art, three major current display technologies for flat-panel televisions include liquid-crystal display (LCD), plasma display, and digital micromirror (DMD) based displays. The micromirror-based displays, and some LCD displays, are projection displays, in that a light source illuminates a spatial light modulator formed by the micromirror or LCD panel, with the modulated light then optically projected to a display screen. Plasma displays, on the other hand, are not projection displays; rather, each pixel at the display screen includes red, green, and blue phosphors that are individually excitable by way of argon, neon, and xenon gases, producing the image. Some LCD televisions involve "direct-view" displays, in which the liquid crystal elements at the display screen are directly energized to produce the image.

In modern micromirror-based projection displays, such as DLP® projection displays now popular in the marketplace using technology and devices developed by and available from Texas Instruments Incorporated, a digital micromirror device spatially modulates light from a light source according to the content to be displayed. An optical "engine", which includes lens and mirror elements, projects the modulated light onto the display screen. As known in the industry, micromirror-based projection displays are advantageous from the standpoint of brightness, clarity, and color reproduction, as compared with other flat-panel televisions and displays. In addition, micromirror spatial light modulators enable higher-speed modulation of light than many LCD systems, and micromirror-based systems have been observed to be extremely reliable over time.

Modern micromirror-based displays project color images by sequentially illuminating the spatial light modulator with light of three or more primary (e.g., red, green, blue) colors within each frame period, so that the spatial light modulator sequentially projects images of these primary colors within that frame period. Assuming that the frame period is sufficiently short, the human eye will integrate the sequential primary color images into a single full-color-image. The illuminating primary color light is conventionally generated by a white light source illuminating a rotating "color wheel", or by three or more monochromatic light sources (e.g., lasers) operating sequentially or simultaneously within the frame period. In either case, however, the light illuminating the spatial light modulator is a fraction of the total light generated within the display system. As a result, single-modulator sequential color display systems project images that have low color content relative to the power available in the system. This inefficiency is present not only in single-modulator micromirror-based systems, but also in sequential-color display systems using other types of spatial light modulators (e.g., LCD). This type of inefficiency can be avoided by providing a spatial light modulator dedicated to each primary color, so that all colors are simultaneously displayed throughout the entire frame period, at 100% duty cycle. However, the multiple-modulator display system is of course much more expensive, because at least three spatial light modulator chips are required, and because of the complex construction necessary to attain precise alignment and superposition of simultaneously projected image color components.

To reduce the effects of this inefficiency in light usage in single-modulator display systems, conventional micromirror-based display systems often include recycling techniques in the illumination path (i.e., prior to the spatial light modulator). These techniques recapture the light of the primary colors (e.g., red, green, or blue) other than the one currently illuminating the spatial light modulator. Examples of conventional light recycling approaches include rod integrators, such as described for example in U.S. Pat. No. 7,052,150 and U.S. Pat. No. 7,184,213, both commonly assigned herewith and incorporated herein by this reference. Conventional sequential color recapture (SCR) techniques are described in U.S. Pat. No. 6,771,325 and U.S. Pat. No. 7,118,226, both commonly assigned herewith and incorporated herein by this reference. Commonly assigned U.S. Pat. No. 6,642,969, incorporated herein by this reference, describes a spiral color wheel for improving the efficiency of light utilization in the illumination system, in combination with dichroic filters to reflect out-of-band light in a sequential color recycling display system. SCR thus refers to the recycling of light before it leaves the illumination module; in other words, SCR techniques recycle light that has not yet illuminated the spatial light modulator.

Another source of inefficiency in light usage is present in micromirror-based displays, as a result of the DMD spatial light modulator reflecting "off" pixel light away from the display screen. For example, as shown in the above-incorporated U.S. Pat. No. 7,184,213, the light for "off" pixels reflected from the digital micromirror is directed to a "light dump", which is a light-absorptive element that keeps this unused light from scattering within the system, which would reduce contrast in the displayed image. Of course, light directed to the light dump is of no further use in the system. This invention is directed to the recovery of this "off" pixel light, as will be apparent from the description provided herein.

By way of further background, contrast in the image displayed by micromirror-based projection systems is degraded by interference between the light of "on" pixels, reflected from the spatial-light modulator at one angle, and the light of "off" pixels that are reflected at another angle. The likelihood or extent of this interference of course depends on the angle to which the micromirrors in the spatial light modulators are deflected in those states. FIG. 1 schematically illustrates the paths of light illuminating and reflected from micromirror M in a conventional micromirror-based projection system. In this schematic illustration, micromirror M is capable of deflecting from a flat state (i.e., undeflected) to either an "on" state or an "off" state, each of such states being at an angle of 10° from the flat state. As known in the art, some modern digital micromirrors now have ±12° angles of deflection. In this display arrangement, light source L illuminates micromirror M, via illumination cone IC, at a nominal angle of −20° relative to its flat state. Of course, the angle of reflection of the illuminating light from micromirror M equals the angle of incidence. As such, with micromirror M is in its flat state, the projection pupil FLAT reflected by micromirror M is at an angle of +20°, because the incident light is at −20° relative to this flat state. For an "on" state pixel, micromirror M is deflected to an angle of −10° relative to its flat state, and thus receives illumination cone IC at a −10° angle of incidence relative to this "on" state. The resulting "on" state projection pupil ON is thus reflected at an angle of 10° from micromirror M in its "on" state, which is at a nominal angle of 0° from the flat state. Conversely, micromirror M is deflected to an angle of +10° relative to the flat state for an "off" pixel, resulting in an angle of incidence of illumination cone IC of −30°, an angle of reflection of 30° for the "off" state projection pupil OFF, which is at an angle of 40° relative to the flat state of micromirror M.

In practice, the flat state of micromirror M is not used in operation. As such, the "projection pupil" FLAT illustrated in FIG. 1 contains light corresponding to noise, such as light reflecting from micromirror M during transitions between the "on" and "off" state, reflection from flat surfaces of the digital micromirror device (e.g., the package window, border metal, etc.). This separation distance between the projection pupils ON and OFF is beneficial, of course, to reduce stray interference of the light of "off" pixels from reducing the contrast of the image projected by the "on" pixels.

The angles of deflection of micromirror M define various attributes of the projection system. For example, as evident from FIG. 1, the angles of deflection define the maximum angle subtended by the projection pupils ON, OFF, FLAT without directly interfering with one another. For example, in modern micromirror spatial light modulators in which the micromirrors are capable of deflecting to angles of ±12°, the ON, OFF, and FLAT projection pupils can each subtend an angle of 24° without directly interfering with one another. These 24° projection pupils correspond to a numerical aperture, or f-number, of f/2.4.

Conventional projection display systems separate the "off" pixel light from the "on" pixel light prior to the "on" pixel light reaching the projection lenses. FIG. 2a illustrates a conventional micromirror-based projection display system, such as described in commonly assigned U.S. Pat. No. 6,824,275, incorporated herein by this reference. In this example, illumination "engine" 12 generates sequential-color light, by way of a conventional lamp and color wheel system, or by way of a set of primary color lasers and a scroller, as known in the art. This generated light is directed at total internal reflectance (TIR) prism 14, which includes an interior surface, between dissimilar materials, that is reflective to light that has an angle of incidence greater than or equal to a critical angle from the normal defined by the difference in refractive index values of the materials (typically a glass/air interface), as known in the art. Incident light at an angle less than this critical angle will be transmitted through the internal surface. As such, the internal surface of TIR assembly 14 reflects the light from illumination engine 12 toward digital micromirror device (DMD) 15, in illumination cone IC.

DMD 15 includes an array of individually controllable deflectable mirrors, each of which is associated with a pixel of the displayed image, and each of which is thus controlled by controller 13 to be deflected into its "on" position or its "off" position, depending on the brightness of the light of the illuminating primary color that constitutes that corresponding pixel in the displayed image. In this example, similarly as in FIG. 1, the "on" pixel position of a given mirror in DMD 15 is deflected toward illumination cone IC; for the example of FIGS. 1 and 2a, this "on" position is at an angle of −10° relative to the flat state, tilting toward illumination cone IC. The light from the "on" pixels, shown as projection pupil ON in FIG. 2a, is directed to TIR prism 14, but at an angle less than the critical angle of its internal reflective surface, and as such is transmitted through that internal surface to projection lens system 16, which focuses and directs that light to display screen 10, displaying the image.

Conversely, the "off" position of each mirror in DMD 15 in the example of FIG. 2a, similarly as shown in FIG. 1, is at an angle of +10° relative to the flat state, tilted away from illumination cone IC. This light from the "off" pixels, shown as projection pupil OFF in FIG. 2a, is also directed to TIR prism 14, also at an angle less than the critical angle of the internal reflecting surface of TIR prism 14, so this light is thus also transmitted by TIR prism 14. As a result of the deflection of the mirrors in DMD 15, projection pupil OFF is directed to absorbing light dump 18, which absorbs this light to reduce stray reflection in the display system.

The arrangement of FIG. 2a thus utilizes TIR prism 14 as an angular analyzer that filters the illumination light on its way to DMD 15 from the reflected light from DMD 15. However, TIR prism 14 does not itself substantially separate the "off" pixel light from the "on" pixel light (although refraction at an external surface of TIR prism 14 may assist in this separation, as shown in FIG. 4 of the above-incorporated U.S. Pat. No. 6,824,275). As such, the distance between the first of projection lenses 16 and the surface of DMD 14 must be sufficient to ensure that the "off" projection pupil OFF does not overlap into the projected light, as it reaches projection lenses 16. In this arrangement, this distance between DMD 15 and the first of projection lenses 16 is occupied by TIR prism 14, as shown in FIG. 2a. While a greater distance between DMD 15 and the first of projection lenses 16 will further facilitate the separation of "off" from "on" pixel light, increasing this distance will necessarily require increasing the size of the enclosure for the projection system. In addition, this distance is related to the back focal length of projection lenses 16 for a given numerical aperture, and thus an increase in the back focal length will require an increase in the diameter of the optics of projection lenses 16. As known in the optics art, this increase in lens size and in back focal distance substantially increases the cost of manufacture of the lenses, especially for relatively "fast" numerical apertures such as f/2.4 and faster. In addition, the complexity of lens design required for aberration correction also increases with increasing aperture size.

As mentioned above, and as evident from FIG. 2a, the efficiency of conventional micromirror-based display systems is also degraded by the loss of that light that illuminates "off" pixels at the DMD. However, it is known to incorporate retro-reflection recycling of the "off" pixel light back into the illumination, thus improving the efficiency of the system and the brightness of its displayed images. Such an arrangement is illustrated in FIG. 2b, in which spherical mirror 19 replaces light dump 18 from the system shown in FIG. 2a. Spherical mirror 19 is effectively concentric with projection pupil OFF, so that off" pixel light is directed back toward DMD 15, as shown by ray RCYC in FIG. 2b. Those micromirrors in the "off" state will thus reflect this reflected light RCYC back to TIR prism 14. Because the reflected light RCYC will be incident on the internal reflecting surface of TIR prism 14 at the same angle of incidence as the light from projection engine 12, this recycled "off" pixel light RCYC will reflect from this internal surface back toward the illumination source. As shown in FIG. 2b, the illumination engine includes light source 12a and integrator 12b. Integrator 12b may be a rod integrator or other similar apparatus known in the art for recovering and recycling reflected light, as described in the above-incorporated U.S. Pat. No. 6,771,325 and U.S. Pat. No. 7,118,226. Integrator 12b will thus receive the recycled "off" pixel light RCYC from TIR prism 14, and recover at least some of that energy as source light to be redirected to DMD 15 via TIR prism 14.

The recovery and recycling of "off" pixel in this known manner is useful in improving the efficiency of the micromirror-based display system, and thus the brightness of the displayed image. However, this known technique has been observed to reduce the contrast of the displayed image, because of the substantial light scattering involved in the redirecting of the "off" pixel light along its same path back to the illumination engine. Such scattering results from diffraction of the recycled light by the various elements in its return path, as well as diffraction resulting from the inefficiency of anti-reflective coatings at these high angles of incidence. In addition, DMD 15 itself causes substantial scattering from those individual micromirrors that are in the "on" position, as well as backside reflectivity and other scattering from mirrors as they make transitions between the states (especially in pulse-width-modulated systems), and also causes diffraction losses inherent to the pixelized nature of DMD 15 itself. In addition, the coupling of the recycled light RCYC from mirror 19 back through DMD 15 and TIR prism 14 is less than ideal, because the "off" pixel light must pass through these elements. For example, an efficiency of only about 62% for the recovery of "off" pixel light in an arrangement as shown in FIG. 2b has been observed, in connection with this invention. Furthermore, this arrangement tends to complicate the focal plane of the projection system, from the standpoint of projection lens system 16.

By way of further background, my copending and commonly assigned U.S. patent application Ser. No. 11/693,343, filed Mar. 29, 2007, incorporated herein by this reference, describes a micromirror-based projection television display system that can be housed in an enclosure that is competitive with modern LCD and plasma display systems. As described therein, conventional micromirror-based projection systems typically require larger "form factor" enclosures, than do LCD and plasma flat-panel systems of similar screen size and resolution, particularly in connection with the "chin" dimension and the "depth" of the enclosure. The display system described therein can be housed in such a competitively-sized enclosure, with excellent optical and thermal performance, because of the arrangement of its projection lenses, including telecentric projection lenses in a first group, followed by a medium-to-wide angle aspheric projection lens formed of plastic with >1.0 magnification, and a plastic aspheric mirror that reflects the projected image to the display screen.

Because of the compact enclosure sizes of display systems using the competing LCD and plasma display technologies, micromirror-based display systems are now subject to extremely tight constraints in their illumination and projection systems. These constraints limit the ability to separate "off" pixel light from "on" pixel light using lens elements that are not cost-prohibitive, yet providing the desired field of view. The recycling of "off" pixel light in such a constrained system, using conventional design techniques, is effectively not possible, without enduring the inefficiencies and increased scattering described above relative to FIG. 2b.

Another constraint faced by the designers and manufacturers of modern micromirror-based projection display systems is the necessity for "fast", or large aperture, projection lenses. An example of this constraint is illustrated in FIG. 2c, and is determined by the angle $\Theta_{tip}$ to which an individual DLP mirror M is deflectable. According to this known design constraint, an angle $\Theta_{max}$ is defined as the maximum angle of light projection that the usable aperture of projection lenses 16 (i.e., the first projection lens $16_0$ as shown in FIG. 2c) must be capable of receiving. This angle $\Theta_{max}$, measured from the normal of mirror M in its flat state, is related to the mirror deflection angle $\Theta_{tip}$ by the relationship:

$$\Theta_{max}=3(\Theta_{tip})+f/\#$$

where f/# is one-half of the angle subtended by the reflected light pupil. For the example of angle $\Theta_{tip}$ of 12°, and a projection pupil having a numerical aperture of f/2.4 (i.e., subtending 24°), the resulting angle $\Theta_{max}$ is 48°. Because this angle $\Theta_{max}$ is measured from the normal, and because this angle in this example is a relatively wide angle (i.e., indicates a relatively fast lens), the numerical aperture of projection lens $16_0$ must be at least as fast as f/0.68 in order to receive the projection pupil from this mirror M, according to conventional calculations.

A projection lens having a numerical aperture of at least as fast as f/0.68 indicates that its optics must be relatively large, especially if its focal length (distance to its rear focal plane) is of any substantial length. As such, for purposes of cost and optical quality, the distance between DMD 15 and this first projection lens $16_0$ is preferably minimized, such as in high numerical aperture microscope objectives, which can attain more than 50× magnification with front focal distances of on the order of one or two hundred microns. However, referring back to FIGS. 2a and 2b, the presence of TIR prism 14 between DMD 15 and projection lens group 16 is a substantial cause of the lengthening of this focal length. In addition, this distance between DMD 15 and first projection lens $16_0$ is also somewhat necessitated in order to separate the "off" and "on" pixel light projection pupils as mentioned above, to maximize contrast. And also, as mentioned above, the retro-reflection of light in the manner illustrated in FIG. 2b can improve the brightness of the displayed image, but will tend to reduce contrast because of the additional scattering involved. Furthermore, this arrangement is vulnerable to additional scattering of the retro-reflected light, and resulting loss of brightness and degraded contrast, due to inefficiency in the anti-reflective coatings of the lens elements at these high angles of incidence.

Another constraint presented to the designer of modern rear projection micromirror-based display system derives from the size of the DMD, and its position within the field of view of the projection lenses. Modern micromirror-based display systems now use a DMD of a size on the order of 0.45 inches diagonally. In rear-projection systems with constrained enclosure sizes, such as described in the above-incorporated application Ser. No. 11/693,343, the image area from a DMD of this size is required to fit within the field of view presented by the projection lens rear group, but offset from the optical axis of the front group of projection lenses, for example in the manner illustrated in FIG. 2d, in which the DMD image 15I is offset by 110% from on-axis. Optically, the overall projection aperture A must accommodate the offset projection pupil. For example, if the projection pupil for DMD image 15I has a numerical aperture of f/2.8, the numerical value of aperture A must be about f/0.68 or faster. In addition, these constraints increase the difficulty of retro-recycling the "off" pixel light in such a system.

BRIEF SUMMARY OF THE INVENTION

It is therefore an object of this invention to provide a micromirror-based display system in which "off" pixel light can be efficiently and effectively recycled back into the illumination engine, without substantially reducing contrast in the displayed image.

It is a further object of this invention to provide such a system in which the size, and thus the cost, of the projection lens elements are modest and reasonable.

It is a further object of this invention to provide such a system in which the distance between the micromirror spatial light modulator and projection lens elements can be minimized.

It is a further object of this invention to provide such a system in which the display system can be housed in an enclosure having a competitive form factor with non-micromirror-based display systems, such as LCD and plasma displays.

Other objects and advantages of this invention will be apparent to those of ordinary skill in the art having reference to the following specification together with its drawings.

The present invention may be implemented into an arrangement of projection lenses with a micromirror-based spatial light modulator. According to this invention, a reflective surface directs incident sequential-color light to the spatial light modulator. Micromirrors in the spatial light modulator direct "on" pixel light in a direction away from the illuminating light, and direct "off" pixel light directly back to the reflective surface, along substantially the same path as the incident illuminating light. A fast projection lens element or elements are placed close to the spatial light modulator, such that the "on" pixel light is received off-axis by the projection lenses; the reflective surface directing the incident illumination light and also the reflected "off" pixel light can be disposed on the distal side of these lens elements from the spatial light modulator.

BRIEF DESCRIPTION OF THE SEVERAL VIEWS OF THE DRAWING

FIGS. 2a and 2b are schematic illustrations of the construction of projection lens systems in conventional micromirror-based display systems.

DETAILED DESCRIPTION OF THE INVENTION

The present invention will be described in connection with its preferred embodiment, namely as implemented into a rear projection display system utilizing one or more digital micromirror devices as spatial light modulators. However, it is contemplated that this invention may also be beneficial as applied in other types of systems involving digital micromirror devices, as well as other optical systems. Accordingly, it is to be understood that the following description is provided by way of example only, and is not intended to limit the true scope of this invention as claimed.

Figure 3:
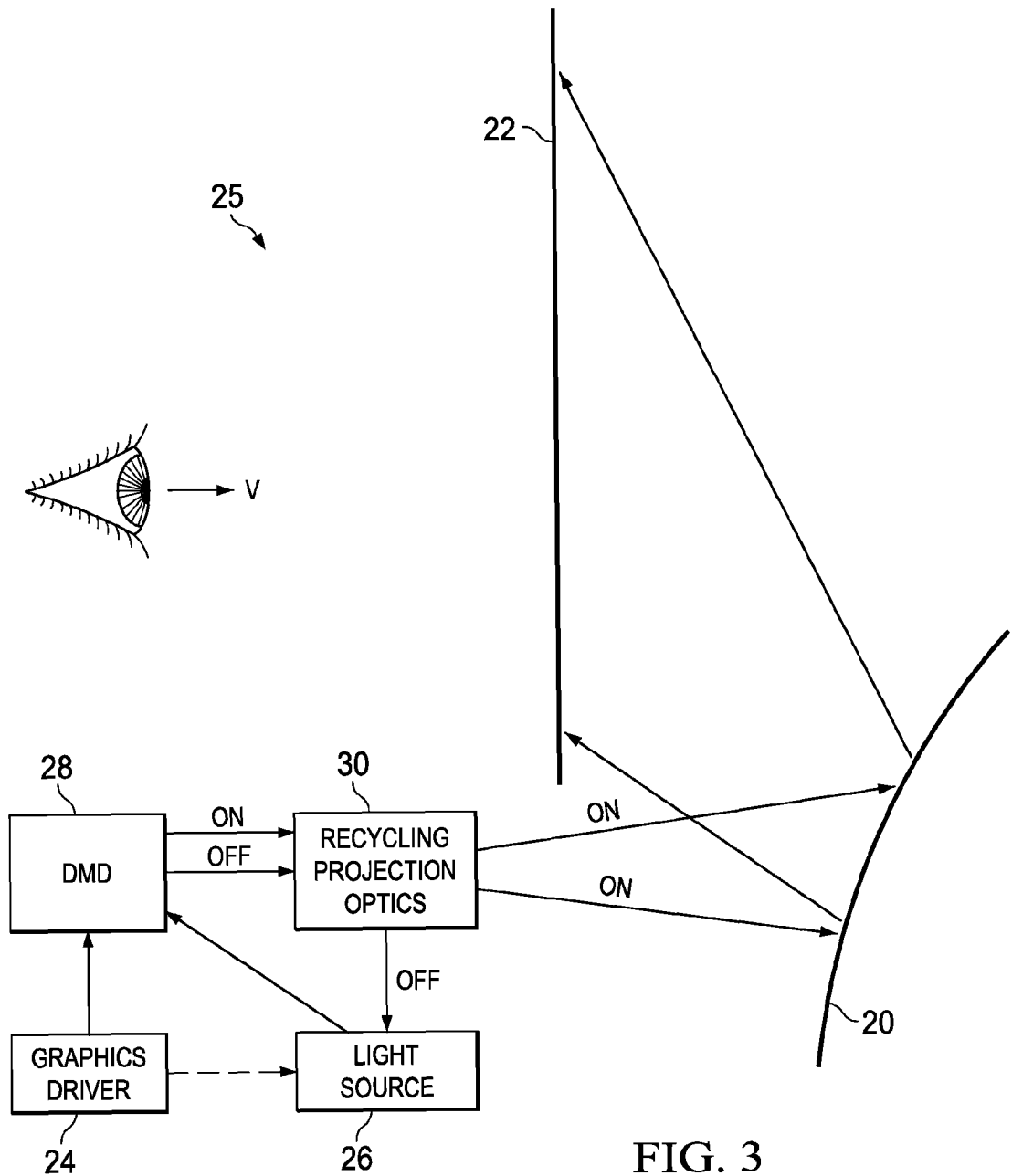
FIG. 3 is a schematic illustration of the construction of a projection display system according to the preferred embodiments of the invention.

FIG. 3 schematically illustrates the functional elements of projection display system 25 according to the preferred embodiments of this invention. The physical arrangement and construction of these elements will be described in further detail below; the illustration of FIG. 3 is presented in a functional manner, to provide functional context for that detailed description.

As shown in FIG. 3, projection display system 25 is a rear projection system, in that the displayed image is projected onto projection screen 22 from behind (i.e., from the opposite side of screen 22 from viewer V). In this preferred embodiment of the invention, screen 22 is preferably a total internal reflection (TIR) Fresnel screen, to permit the image to be projected from an offset position from the center point of screen 22. In this case, the displayed image is projected by aspheric mirror 20 from below and behind screen 22.

According to this embodiment of the invention, light source 26 directs light of multiple primary colors at digital micromirror (DMD) spatial light modulator (SLM) 18 in the conventional manner. Light source 26 is preferably a laser light source that directs light of at least three primary colors (e.g., red, green, blue) at DMD 18 in a time-multiplexed manner. As known in the art, other sequential primary color light sources can be constructed as a bulb-and-reflector type of white light source that illuminates a rotating color wheel having multiple colored filters. According to the preferred embodiment of this invention, light source 26 includes a light integrator or similar apparatus for receiving light that is rejected or otherwise returning from the light path, and for "recycling" or redirecting that returning light back into incident light upon DMD 28. Examples of such light integrators are described in commonly assigned U.S. Pat. No. 6,642,969, U.S. Pat. No. 6,771,325, U.S. Pat. No. 7,118,226, and U.S. Pat. No. 7,184,213, all incorporated herein by this reference. The construction of light source 26 utilizing such integrating rods, according to the preferred embodiments of this invention, will be described in further detail below.

Alternatively, the light integrator and reflector can be realized by the light source itself. For example, an LED may serve as the source of polychromatic (i.e., white) light for illuminating DMD 28 via a color wheel. Modern LED light sources are formed by solid-state devices that overly a reflective film or layer; as such, return light directed at the LED will be reflected from this reflective film, and can also excite electrons in the LED to replenish photoelectric emission of the device. In such an LED-based light source, a homogenizer formed of a glass rod or a lens array preferably spreads the return light prior to reaching the LED, to improve recycling performance. Examples of such recycling LED light sources are known in the art.

Figure 2C:
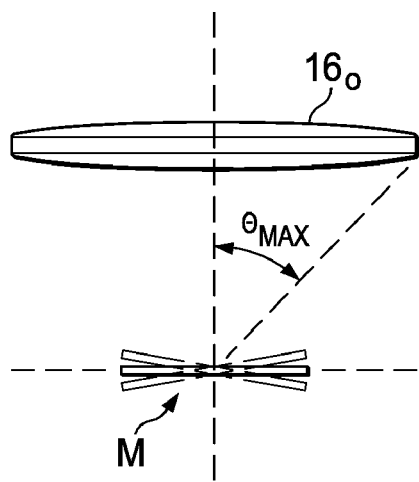
FIGS. 2c and 2d illustrate optical constraints in a micromirror-based display system.
Figure 2D:
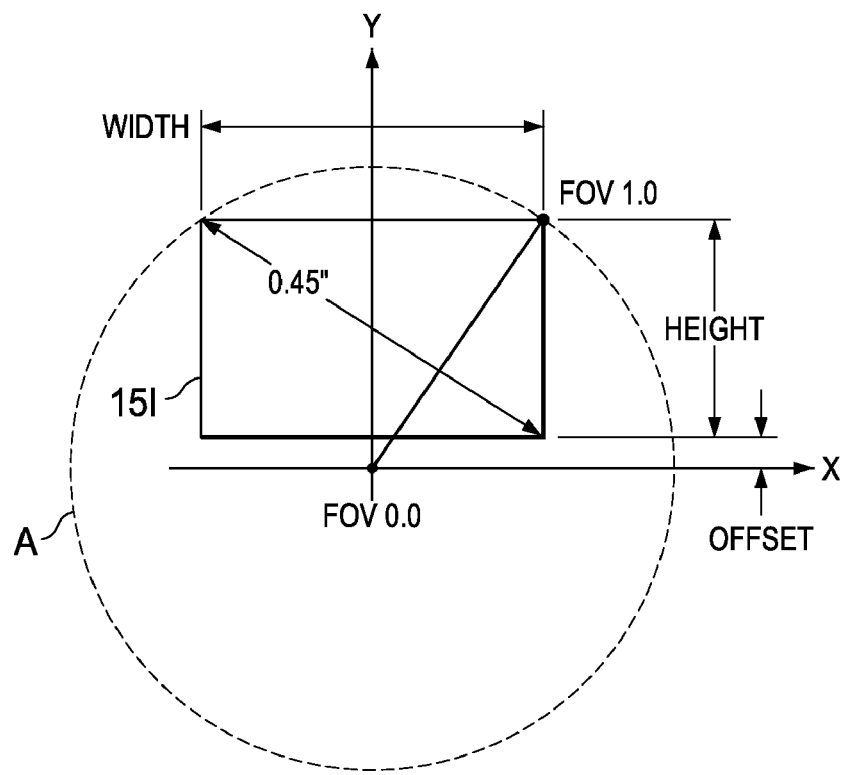

DMD 28 spatially modulates the incident light from light source 26, in response to control signals from graphics driver 24. In this preferred embodiment of the invention, DMD 28 includes a large number of individually controllable micromirrors, each corresponding to one pixel of the resulting image, and each controlled in a time-sequential fashion to selectably reflect light in the desired light path according to be displayed. DMD devices suitable for use as DMD 28 are well-known in the art, for example those digital micromirror devices in the DLP® product family available from Texas Instruments Incorporated. While one DMD 28 is illustrated in FIG. 2, and sequentially or simultaneously modulates light of multiple primary colors to produce a full-color displayed image, it is contemplated that this invention is also applicable to systems that implement multiple DMD devices 28 (e.g., three DMDs 28, one each for red, green, and blue light), as will be evident to those skilled in the art having reference to this specification.

In addition, graphics driver 24 can optionally issue control signals to light source 26 so that the illuminating light can be controlled according to the image content; for example, as known in the art, the duty cycle of each color within each frame can be changed from frame to frame, based on the image content.

Typically, DMD 28 will be controlled by graphics driver 24 in a pulse-width-modulated manner, to precisely control the brightness of light reflected from DMD 28 for each primary color for each pixel. According to this preferred embodiment of the invention, as will be described in further detail below, incident light from light source 26 that is not to be part of the displayed image (i.e., that light that is directed away for "off" pixels) is recycled for efficiency, through the operation of recycling projection optics 30. This "off" pixel light, which is not to be part of the displayed image, includes light corresponding to pixels in the displayed image that are to be completely dark during the field or frame of the displayed image; in addition, this "off" pixel light also includes incident light during the "off" portion of the duty cycle in pulse-width-modulated display systems, for pixels that are not at full brightness for the frame. In this manner, DMD 28 spatially modulates the light that is eventually projected onto screen 22, with the modulation being controlled according to the information in the image to be displayed.

According to this preferred embodiment of the invention, both the "on" pixel light and the "off" pixel light reflected from DMD 28 are received by recycling projection optics 30. Recycling projection optics 30 retro-reflects the "off" pixel light from DMD 28 directly back into light source 26 (i.e., not via DMD 28) for re-use, and focuses the "on" pixel light from DMD 28 into a pattern of light of the desired size and resolution upon aspheric mirror 20. This focused pattern will, as mentioned above, reflect from aspheric mirror 20 onto the backside of screen 22. Recycling projection optics 30 also compensate and correct for aberrations in the light pattern, and those aberrations resulting from the shape of aspheric mirror 20. The detailed construction of recycling projection optics 30 according to the preferred embodiments of the invention will be described in further detail below.

Figure 4A:
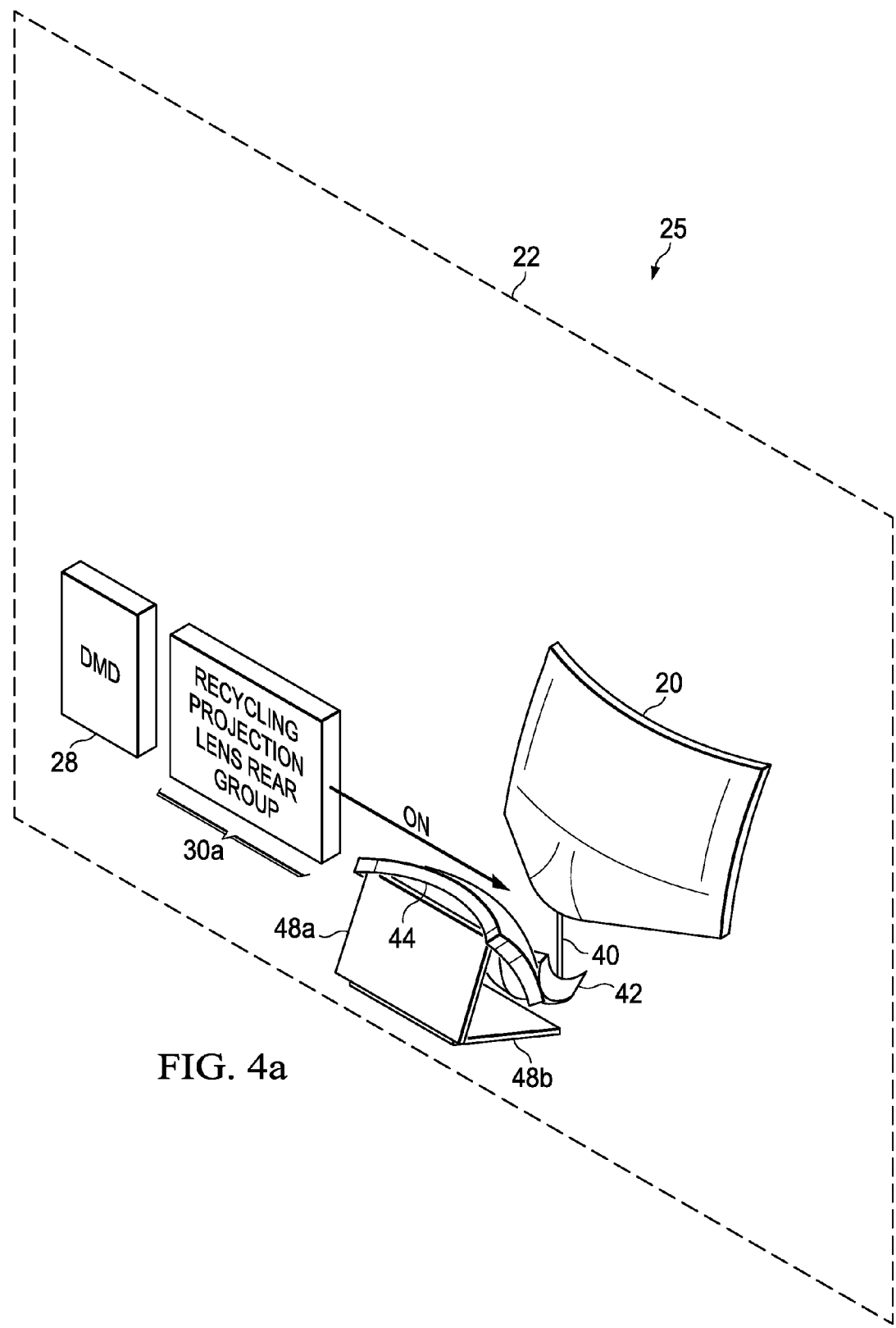
FIGS. 4a through 4d are perspective views of a projection display system according to the preferred embodiments of the invention.

Referring now to FIGS. 4a through 4d, the general physical arrangement of these components into the form factor of micromirror-based display system 25, according to the preferred embodiment of this invention, will now be described. As shown in FIG. 4a, DMD 28 and recycling projection lens rear group 30a are shown in block diagram form; their construction will be described in further detail below. DMD 28 and recycling projection lens rear group 30a are positioned to the lateral side of optical actuator 40, to which the focused light from recycling projection lens rear group 30a is directed. Optical actuator 40 is a fully-reflective plane mirror that redirects the path of the light projected from last lens 39. According to the preferred embodiment of the invention, optical actuator 40 is slightly "dithered" between two angles relative to the optical axis of lenses 33 through 39. In this regard, it is contemplated that optical actuator 40 includes a motor or other mechanism for controllably positioning its reflective surface at a selected one of at least two different angles, relative to the optical axis of rear group 20a. It is contemplated that this motor or mechanism will be controlled by circuitry within the display system, for example by graphics driver 24 itself, or by other circuitry that is synchronized to graphics driver 14.

As known in the art in connection with the SMOOTH PICTURE™ technology developed and available from Texas Instruments Incorporated, odd-numbered image pixels can be assigned to one subframe of an image frame, and even-numbered image pixels can be assigned to a second subframe. The timing control signals applied to DMD 28 can be similarly divided. In displaying the image, optical actuator 40 is placed at one angle relative to the optical axis of recycling projection lens rear group 30a for one subframe, and is placed at a second angle relative to that optical axis for the next subframe. The angles of optical actuator 40 are selected so that the difference between these two positions, in projected light path at screen 22, is about one-half pixel width. Typically, the pixels of DMD 28 are diamond-shaped, such that the light beam or ray from a given pixel is shifted in the direction orthogonal to that defined by optical actuator 40, also by one-half the pixel width. As such, optical actuator 40 not only directs the projected light along its path in a different direction from that of recycling projection lens rear group 30a, but also implements the SMOOTH PICTURE™ technology so that the resulting resolution of the displayed image is greatly improved.

According to this embodiment of the invention, the overall projection optics system 30 also includes a front group of lenses. This front group of projection lenses includes three aspheric elements, namely aspheric meniscus lenses 42, 44, and aspheric mirror 20. An example of these aspheric elements, for this preferred embodiment of the invention, is described in my copending U.S. patent application Ser. No. 11/693,343, filed Mar. 29, 2007, incorporated herein by this reference. Each of these aspheric elements 42, 44, 20 is constructed of optical acrylic plastic, which permits these elements to be physically "clipped" at or near its optical axis, because the optical path utilizes only a portion of the entire aspheric surface. This greatly facilitates the positioning of these aspheric elements within the enclosure of the display system. According to this embodiment of the invention, sufficient space is provided between aspheric lens 42 and aspheric lens 44 for two-surface folding mirror 48, which bends the light path back on itself to save additional form factor volume. According to this embodiment of the invention, aspheric lenses 42, 44 are constructed to operate as a medium-to-wide angle projection lens system, which reduces the magnification required of aspheric mirror 10.

As suggested by FIG. 4a, recycling projection lens rear group 30a is oriented so that its optical axis is generally parallel to the plane of screen 22, with the path of its projected light diverted substantially perpendicularly by optical actuator 40. This orientation permits the depth of an enclosure for display system 15 to be minimized. Aspheric lens 42 is positioned, with its optical axis generally in the perpendicular plane relative to screen 2, receives the projected light as reflected by optical actuator 40 and directs that light to folding mirror 48.

Folding mirror 48 is constructed as two planar reflective panels that are at a selected angle (generally perpendicular) relative to one another, and that are disposed in the light path between aspheric lens 42 and aspheric lens 44. As shown in FIGS. 4a and 4d, the presence of folding mirror 48 enables aspheric lens 44 to reside substantially above aspheric lens 42, within the physical arrangement of the display system. Aspheric lens 44 is aimed at aspheric mirror 20, which in turn is positioned to direct projected light to screen 22.

Figure 4B:
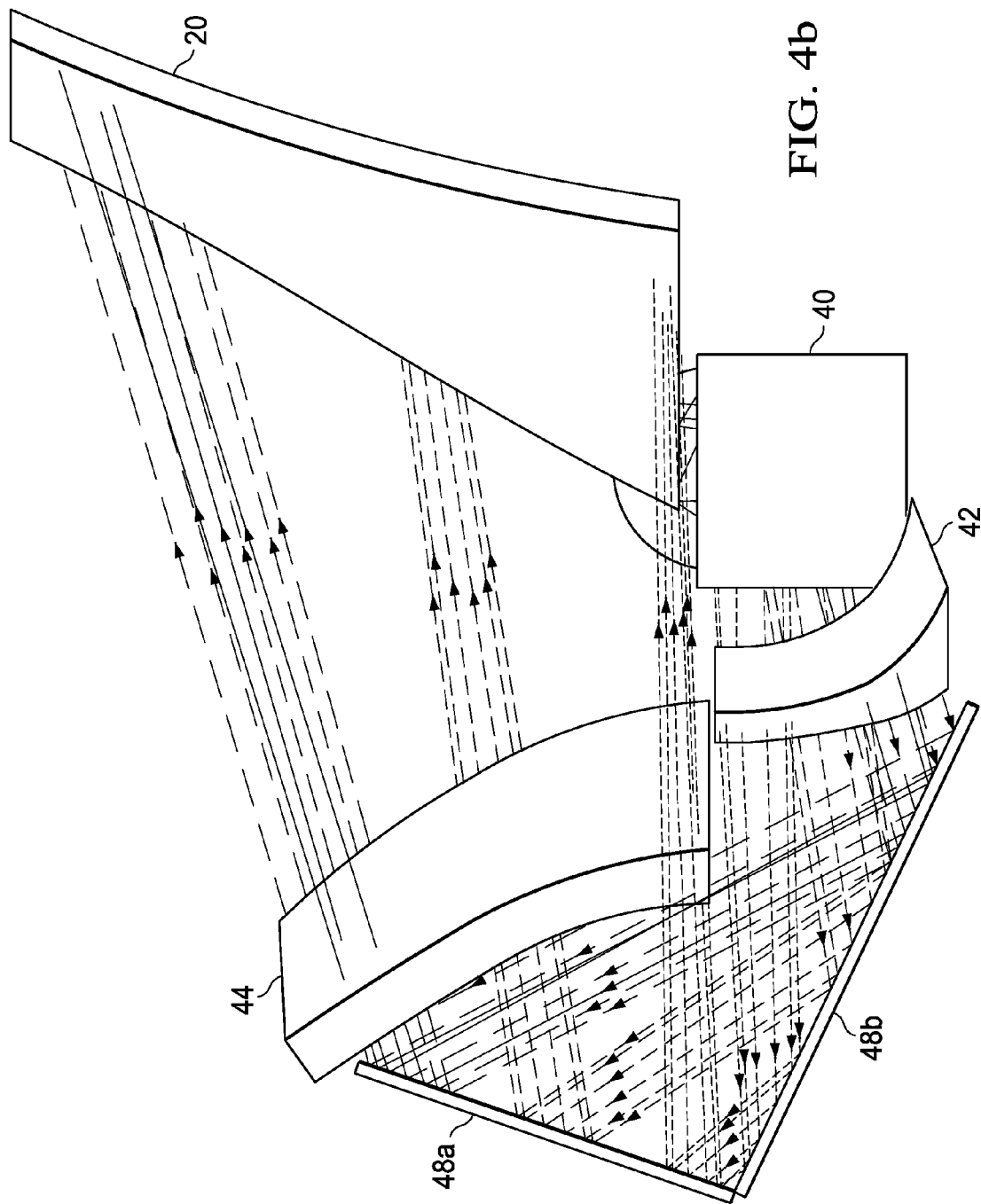

FIG. 4b illustrates the light path from optical actuator 40 to screen 22. In this arrangement, the light projected from recycling projection lens rear group 30a and reflected by optical actuator 40 is then transmitted by aspheric lens 42 toward bottom panel 48b, and reflected from bottom panel 48b to top panel 48a, from which the light is reflected to aspheric lens 44. Aspheric lens 42 magnifies the image of the projected light, as evident from the diverging light rays illustrated in FIG. 4b. The light reflected from top folding mirror panel 48a is then further magnified by aspheric lens 44, and projected onto the surface of aspheric mirror 20, which in turn reflects the projected light toward screen 22. It is contemplated that the magnification applied by aspheric lens 44 (and, to a lesser extent, by aspheric lens 42) reduces the curvature and magnification of aspheric mirror 10, improving the overall resolution and fidelity of the projected image.

Figure 4C:
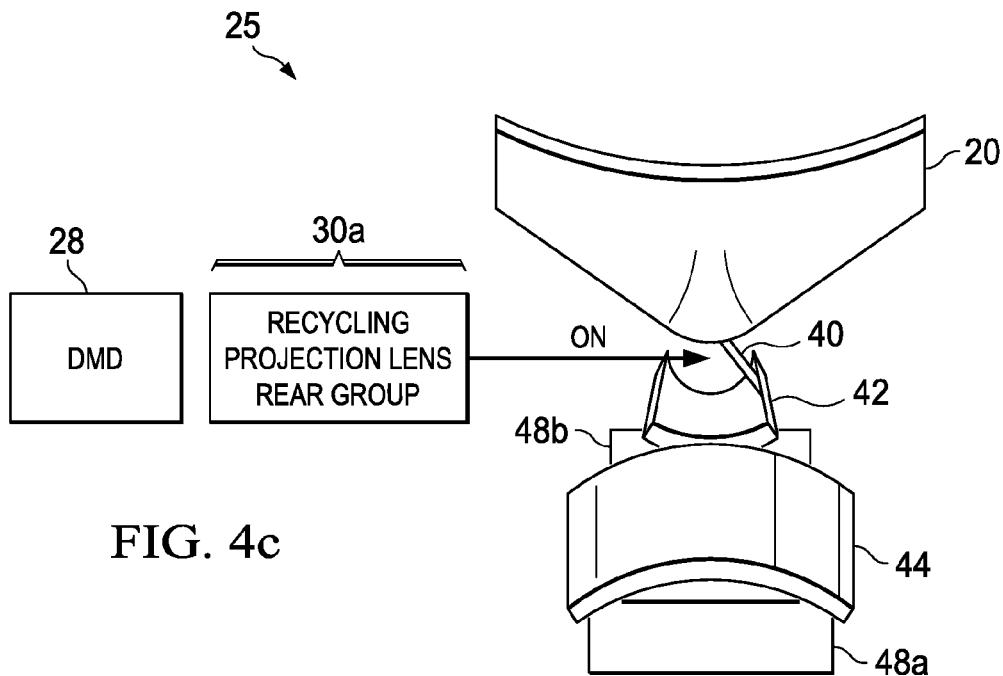
Figure 4D:
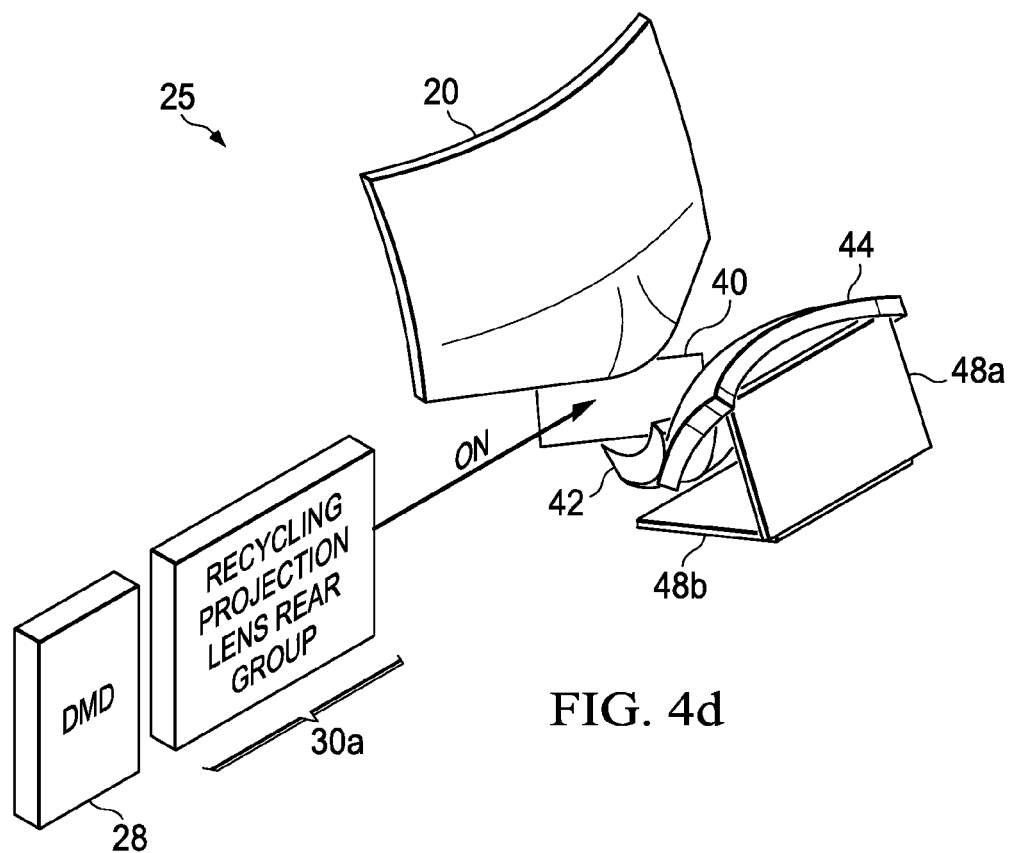

FIG. 4c illustrates the physical arrangement of projection optics 20 within projection system 15 in a top-down view, further illustrating the physical relationship of aspheric lenses 42, 44 to one another, and to the other elements. FIG. 4d is a perspective view of these elements from the opposite direction from that shown in FIG. 4a, and further illustrates the reflecting surface of optical actuator 40.

Figure 5A:
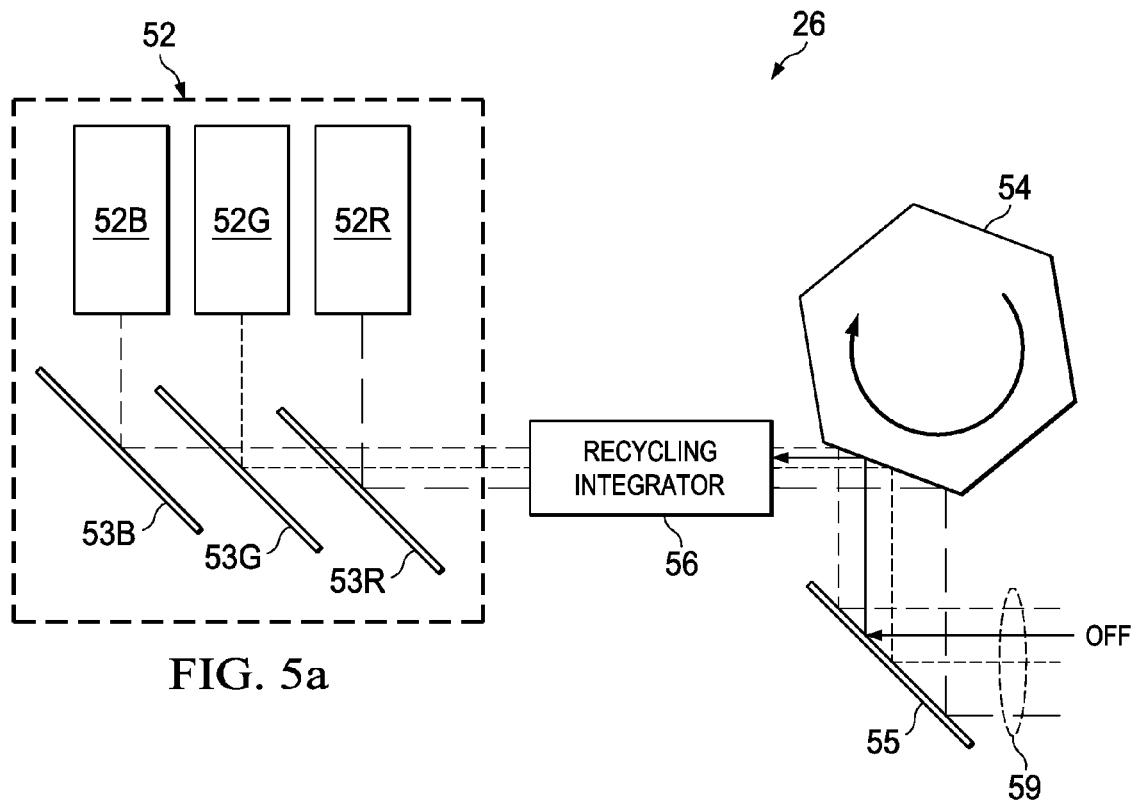
FIGS. 5a and 5b are schematic diagrams illustrating the construction and operation of a recycling light source in the projection display system according to the preferred embodiments of the invention.
Figure 5B:
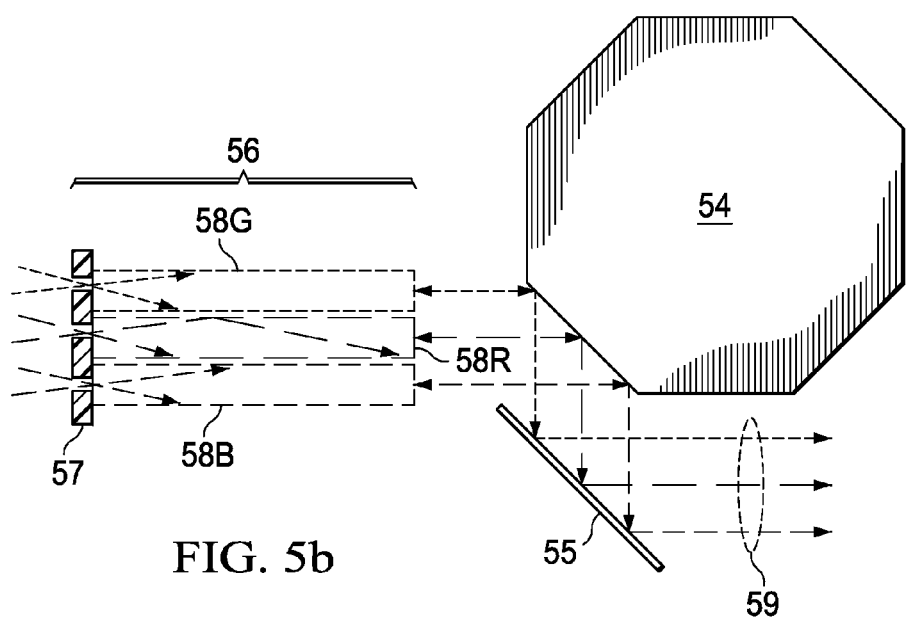

Referring now to FIGS. 5a and 5b, the construction and operation of light source 26 according to this preferred embodiment of the invention will now be described. While it is contemplated that other light source types and arrangements may be used in connection with this invention, such light sources including a polychromatic or white light lamp in combination with a color wheel, as known in the art. It is contemplated that a laser-based light source, such as light source 26 of FIGS. 5a and 5b, will be especially beneficial in connection with this invention.

As shown in FIG. 5a, laser array 52 provides the light energy involved in the projection of images in the display system constructed according to this embodiment of the invention. In this example, laser array 52 includes one or more lines of solid-state lasers, for each of three or more colors. Typically, the three "primary" colors of red, blue, and green are used in projection display systems; as such, laser array 52 includes one or more lines of lasers in an array for each of these colors. As suggested by FIG. 5, these arrays 52R, 52G, 52B (for red, green, blue, respectively) are spatially separated from one another, such that the collimated monochrome light from each array 52R, 52G, 52B travels in a plane, parallel but not coplanar with the light from the other arrays 52R, 52G, 52B. The length of each of arrays 52R, 52G, 52B (i.e., the number of solid-state laser emitters in each) corresponds to the corresponding dimension of DMD 28, so that each array 52R, 52G, 52B can illuminate a portion of DMD 28 across its width (i.e., corresponding to the width of the projected image). The planes of collimated monochromatic light from arrays 52R, 52G, 52B are directed by corresponding mirrors 53R, 53G, 53B, respectively, to rotating mirror 54 via recycling integrator 56.

Rotating mirror 54, in this embodiment of the invention, is a rotating mirror having multiple reflective surfaces. In this example, rotating mirror 54 has a hexagonal cross-section, and is of sufficient length (in the direction normal to the page of FIG. 5) to direct the entire width of the output from each of arrays 52R, 52G, 52B. It is contemplated that those skilled in the optics art will be readily able to design rotating mirror 24 and the various other mirrors involved in light source 26 using conventional design techniques. Mirror 55 re-directs the reflected light of each color from rotating mirror 54 to a time-varying region of DMD 28. In this manner, it is intended that the light of each of arrays 52R, 52G, 52B will illuminate one or more micromirrors in separate one-third regions of DMD 28. In any case, DMD 28 is synchronously controlled, by graphics driver 24 as discussed above, to spatially modulate the collimated light of the appropriate primary color, according to the information in the image to be displayed. The modulated light for "on" pixels is then passed by DMD 28 to recycling projection lens rear group 30a.

As evident from FIG. 5a, in this example, recycling integrator 56 passes the multiple color light from laser array 52 to different regions of rotating mirror 54 and mirror 55, and via lens 59 to DMD 28. In addition, as shown in FIG. 5a and as will be described below, recycling integrator 56 receives returning "off" pixel light OFF from DMD 28 via lens 59 and mirrors 54, 55, and recycles that return light according to conventional techniques, depending upon the type of illumination used in the system. For example, in a scrolling sequential color system as shown in FIG. 5a, recycling integrator 56 can include an integrating rod and color filter arrangement to implement sequential color recapture (SCR), as described in commonly assigned U.S. Pat. No. 6,642,969, U.S. Pat. No. 6,771,325, U.S. Pat. No. 7,118,226, and U.S. Pat. No. 7,184,213, incorporated herein by this reference. As described in those commonly assigned patents, the color filter involved in recycling integrator 56 may be a color wheel including dichroic reflecting color filters, or such other color filters as electronically-switchable or holographic filters.

FIG. 5b illustrates a specific implementation of "off" pixel state light recycling in connection with the scrolling illumination subsystem of FIG. 5a. In this example, recycling integrator 56 is realized by way of three separated lightpipes 58B, 58R, 58G, each associated with one of the primary colors of light emitted by laser array 52 (i.e., blue, red, and green, respectively). Perforated mirror 57 is disposed at the back surface of lightpipes 58, with an opening therethrough provided to pass light of the corresponding color into each of lightpipes 58. According to this embodiment of the invention, as implemented according to FIG. 5b, the "off" pixel state light is perfectly recycled, with "off" pixel light of each color re-imaged by its own lightpipe 58B, 58R, 58G. This dedicated-color light recycling ensures good optical quality, by definition, due to lens 59, which maintains the color separation of the returning "off" pixel light. Scrolling mirror 54 of course directs the return light back to its corresponding one of three lightpipes 58B, 58R, 58G. According to this embodiment of the invention, therefore, recycling integrator 56 is constructed so that the illuminating and recycled light are separated by color, and are not mixed. The construction of each of lightpipes 58B, 58R, 58G mixes and evenly redistributes the "off" pixel state light, so that it is not reimaged onto the same pixels of DMD 28 again, but is instead directed to other pixels of DMD 28 that may be in the "on" state. This ensures that recycled "off" pixel light is "trapped" in the path to and from "off" state pixels, as can occur in slow-moving or slowly-changing displayed images, such as still images or video sequences in which the brightness or color changes slowly. Accordingly, lightpipes 58B, 58R, 58G serve as partial diffusers of the recycled light so that returning "off" pixel light can illuminate "on" pixels of DMD 28.

Alternatively, if light source 26 illuminates DMD 28 with primary colors in a field-sequential manner, a single light pipe and back mirror arrangement can be implemented as recycling integrator 56.

Figure 6A:
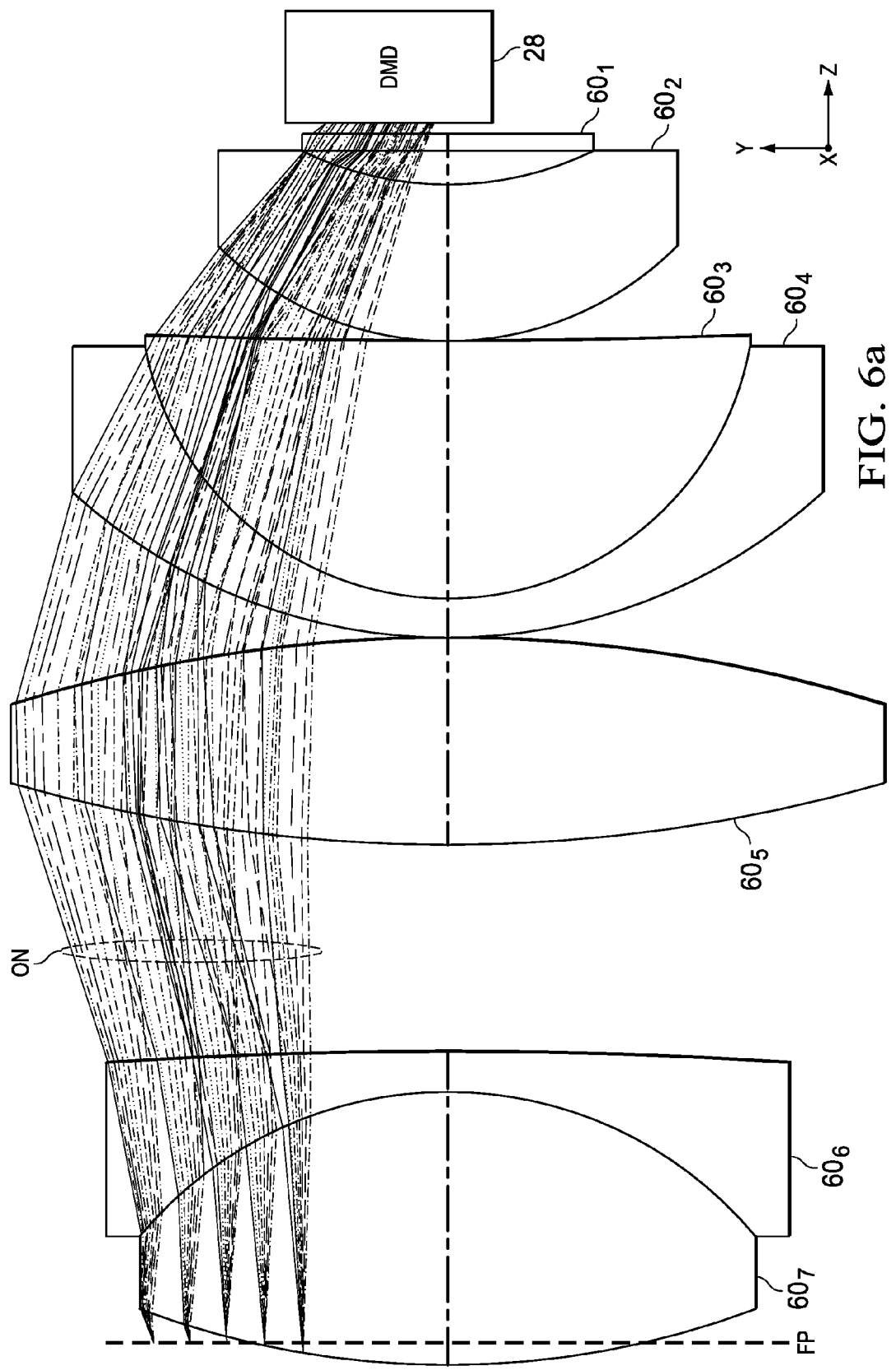
FIG. 6a is a cross-sectional view of a rear group of projection lens elements according to an off-axis preferred embodiment of the invention.

Referring now to FIG. 6a, the construction of recycling projection lens rear group 30a according to a first preferred embodiment of this invention will now be described in detail. FIG. 6a illustrates the arrangement of lens elements $60_1$ through $60_7$ relative to DMD 28, according to this preferred embodiment of the invention. As evident from FIG. 6, lens element $60_1$ is a substantially flat glass element, corresponding to the window of DMD 28. As will be evident from the following description, the angle of incidence of light from DMD 28 can be quite high, for example on the order of 48 degrees or so; at these high angles of incidence, anti-reflective coatings will be relatively inefficient. It is therefore possible to eliminate the window (i.e., lens element $60_1$) from DMD 28, in which case the next lens element $60_2$ could instead seal the package of DMD 28 without such a flat window. In any event, the other lens elements $60_2$ through $60_7$ are preferably high quality lens elements of optical glass that cumulatively form a lens group having a relatively fast numerical aperture (e.g., f/0.68, on the optical axis).

Lens elements $60_0$ through $60_7$ are constructed to fit stringent optical quality requirements, including a fast numerical aperture, while maintaining a short back focal length to DMD 28, to minimize the diameter, cost, and optical complexity of these lens elements 60. In an example of a design according to this preferred embodiment of the invention, the distance between entrance pupil plane FP and DMD 28 is about 71 mm while the aperture of entrance pupil plane FP sufficient to receive the full focused image is about 36 mm. It has been discovered, according to the preferred embodiments of this invention, that the resulting projection lens rear group 30a must be reasonably corrected for aberration, but need not be perfectly corrected; for example, aberration on the order of 100μ can be corrected by the aspheric lenses of projection lens front group 30b. In addition, as known in the art, anti-reflective lens coatings are inefficient at high angles of incidence from the normal; as such, several lens elements 60 are required to ensure that angles of incidence are decreased at each surface, and are near to the normal. These attributes are attained, in this example, by lens elements $60_1$ through $60_7$ constructed according to this example of the preferred embodiment of the invention in the manner described by Table 1, in which the lens elements and spaces therebetween are listed in the order from DMD 28 to focal plane FP (i.e., right-to-left in FIG. 6a):

TABLE 1

| radius of curvature (mm) of entry surface | thickness (mm) (on-axis) | material | angle of incidence at entry | element diameter (mm) at entry | Lens element |
|---|---|---|---|---|---|
| ∞ | 1.1 | BK7 glass | 12 | 18 | window $60_1$ |
| ∞ | 2.659 | air | 12 | 21 | space to lens $60_2$ |
| 23.188 | 11.47 | N-LASF46A glass | 12 | 33.5 | lens element $60_2$ |
| 24.695 | 0 | air | 6 | 42.1 | space to lens $60_3$ |
| 417.2725 | 18.718 | LAFN21 glass | 18 | 43.8 | lens element $60_3$ |
| 22.60428 | 3.0 | SF59 glass | 49 | 54 | lens element $60_4$ |
| 41.8389 | 0.1 | air | 26 | 42.1 | space to lens $60_5$ |
| −105.3134 | 15 | TAFD30 glass | 16 | 61.2 | lens element $60_5$ |
| 114.7488 | 15.323 | air | 34 | 61 | space to lens $60_6$ |
| −478.0155 | 3.0 | TAFD30 glass | 7 | 48 | lens element $60_6$ |
| −30.17036 | 20 | SSK50 glass | 47 | 43.8 | lens $60_7$ |
| 64.0 | 0 | Air | 37 | 11.0 (decentered by 16.0 mm) | space from lens $60_7$ to aperture stop plane FP |

As evident from this description, lens element $60_2$ is a meniscus lens that is in a near-aplanetic configuration, so that the angle of incidence of light from DMD 28 on the diopter is minimized, to avoid the inefficiencies of anti-reflective coatings at higher angles. In this configuration, the design of lens elements 60 as described above is constrained so that the angle of incidence on all diopters is 37 degrees or less from the normal where possible. For those surfaces at which the angle of incidence cannot be reduced to this extent, for example at the interfaces between lens elements $60_3$ and $60_4$ and between lens elements $60_6$ and $60_7$, the corresponding diopter is embedded in a glass-glass interface with a refractive index break that is lower (e.g., <0.3) than that of a glass-air interface (i.e., >0.5), to minimize Fresnel losses without requiring complex anti-reflective coatings. The projection pupil ON for "on" pixel light from DMD 28 is also illustrated in FIG. 6a. As evident in this example, the "on" pixel light pupil ON is off the optical axis of lens elements $60_0$ through $60_7$. The projection pupil (not shown) for the "off" pixel light travels in the lower portion of lens elements 60.

In this preferred embodiment of the invention, because the "on" pixel light is applied "off-axis" from DMD 28 (and relative to optical axis of projection lens rear group 30a), the angular separation of "on" and "off" pixel light achieved by the preferred embodiments is very high, as much as twice the f-number of the projection pupils. This increased angular separation reduces the interference and potential for interference between the "on" pixel light and the "off" pixel light. As known in the art, diffusion and parasitic reflection from the backside of DMD 28 is not strongly dependent on the angle of incidence, but has its energy concentrated at the normal from the surface of DMD 28 (e.g., with the reflected energy distribution behaving with the cosine of the angle from the normal, for the case of a perfect diffusing surface). Accordingly, because the "on" pixel light is off-axis from DMD 28 in this embodiment of the invention, to the extent that light scattering is present in the system, the coupling of this scattered and back-reflected light to the off-axis "on" pixel light is reduced from conventional systems.

Figure 6B:
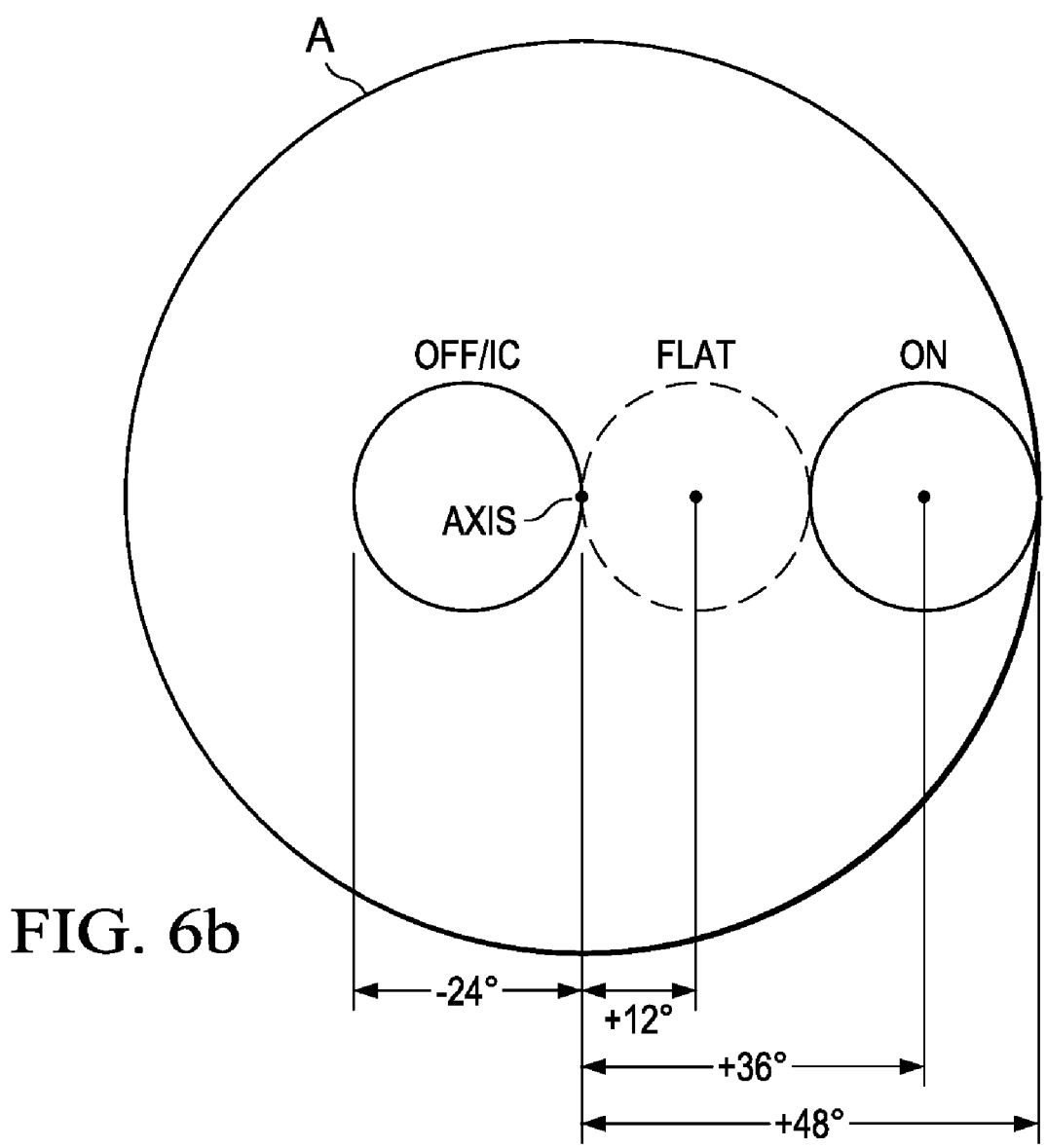
FIG. 6b illustrates the aperture of rear group of projection lens elements of FIG. 6a, and the position of the "on" pixel light projection pupil therein.

FIG. 6*b* illustrates the position of the "on" pixel light projection pupil ON within the overall aperture A of lens elements 60, corresponding to the example of FIG. 6*a* but as viewed in a direction coaxial with optical axis AXIS of lens elements 60. As evident from FIG. 6*b*, projection pupil OFF/IC is also provided within aperture A, and corresponds to the illumination light from light source 26 and also the return "off" pixel light retro-reflected to light source 26. For the example of DMD 28 in which the micromirrors tilt by +12° and −12° for "on" and "off" pixel light, and allowing for an "aperture" FLAT that is disposed adjacent to optical axis AXIS and between projection pupils ON and OFF as shown in FIG. 6*b*, the numerical aperture of projection pupil ON will be about f/2.4. The numerical aperture of aperture A of lens elements 60 must be at least f/0.68 in order to accommodate the pupils illustrated in FIG. 6*b*. However, because the distance between DMD 28 and the nearest lens element 60$_1$ can be kept very short because no TIR prism is required according to this invention, the cost involved of manufacturing optically correct lens elements 60 of this relative aperture is not excessive.

As evident from FIG. 6*b*, the entirety of aperture A of lens elements 60 is not involved in the projection and focusing of the "on" pixel light and the corresponding image. Rather, only the off-axis region of lens elements 60 carrying the "on" pixel light (i.e., the region corresponding to projection pupil ON of FIG. 6*b*) need be optically correct and present little or no pupil or image aberration. According to this preferred embodiment of the invention, therefore, lens elements 60 need only be optically optimized for this critical region of their apertures, and need not be optically optimized over the remainder of their apertures. As such, the cost involved in producing the fast (i.e., large aperture size) lens elements can be reduced, if desired.

Still further in the alternative, given the large separation provided by this embodiment of the invention as evident from FIG. 6*b*, the aperture subtended by projection pupil ON may be enlarged from that illustrated in FIG. 6*b*, without interfering with illumination cone IC and while remaining separate from "off" pixel light projection pupil OFF. This larger aperture projection pupil ON can be attained, for example, by providing a light source with a larger source etendue. This larger aperture projection pupil ON would provide a brighter image, because of the higher illumination power resulting from the larger source etendue, for the same size DMD 28 and for the same tilt angle $\Theta_{tip}$, yet without interference with the corresponding larger aperture projection pupil OFF. This increase in the projection pupil aperture would not be achievable with conventional optical architectures, including a TIR prism as illustrated in FIG. 2*a* because, by construction, the relative aperture (f-number) of the TIR prism must be lower than the mirror angle of DMD 28 in order for the "on" and "off" pixel light beams to be spatially separated prior to entering the projection lens.

Figure 6C:
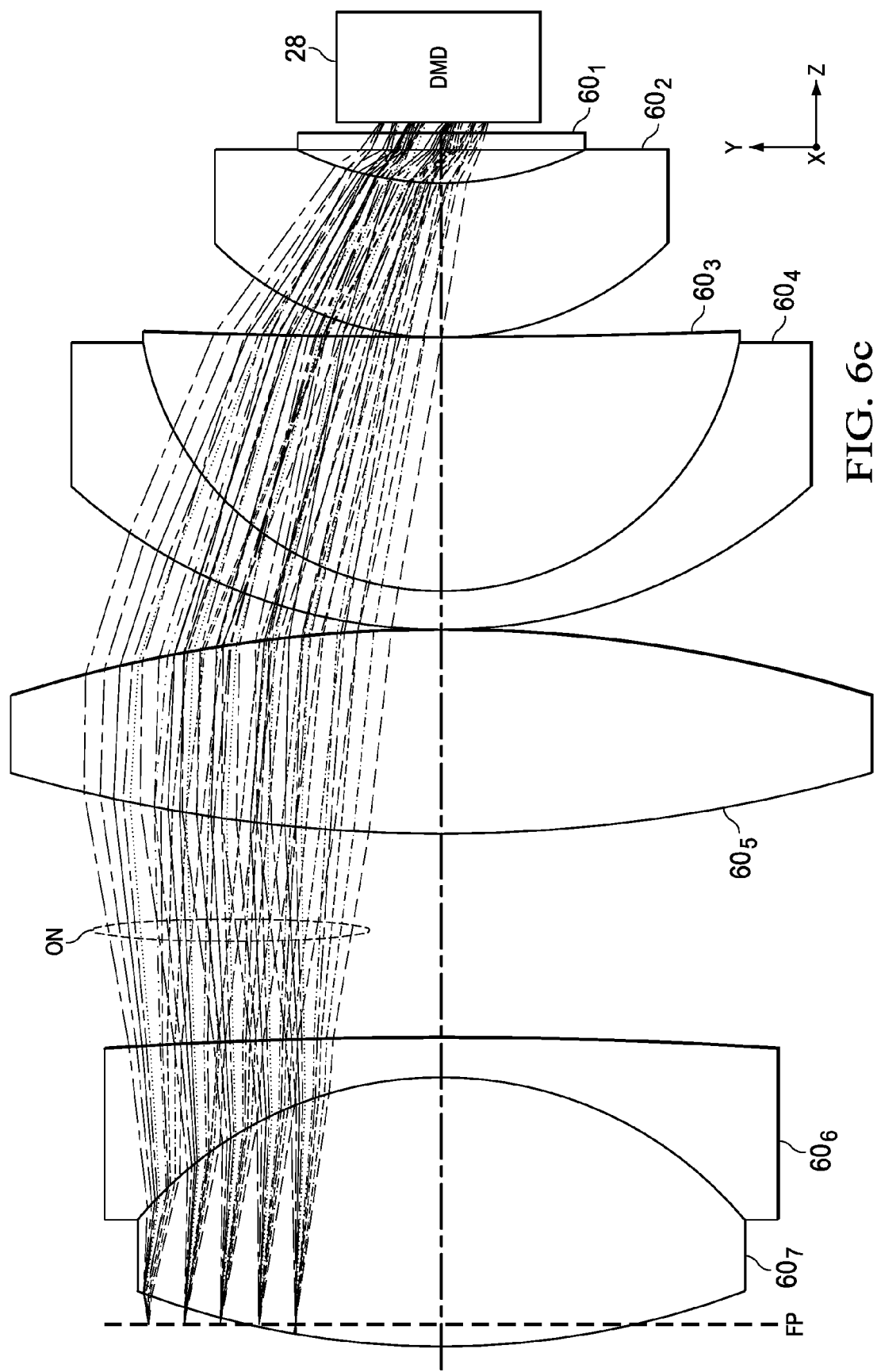
FIG. 6c is a cross-sectional view of a rear group of projection lens elements according to an on-axis preferred embodiment of the invention

On the other hand, the "on" pixel light may be directed "on-axis" from DMD 28 if desired, as shown in FIG. 6*c*. In this embodiment of the invention, the "off" pixel light is still redirected back to light source 26, more or less along the path of the illuminating light. This "on-axis" implementation is contemplated to be more useful in a front projection display system, or in a rear projection display system in which the enclosure depth is less of a concern. While the separation between the "on" pixel light and the "off" pixel light may not be as great according to this embodiment of the invention, the field-of-view constraint is greatly relaxed because the image projected from DMD 28 is also not offset from the optical axis. Accordingly, the diameter of the aperture required of projection lens rear group 30*a* can be reduced for this implementation, further reducing the cost of these lenses and also of projection lens front group 30*b*; alternatively, lens elements 60 need only be optimized over this smaller on-axis portion of their apertures. The efficiencies provided by recycling the "off" pixel light are still attained, of course.

As evident in FIGS. 6*a* and 6*c*, no space for providing a TIR prism between DMD 28 and lens elements 60 is included in the arrangement according to these embodiments of the invention. As discussed above relative to the Background of the Invention, conventional projection display systems included such a TIR prism to direct the illumination light to the DMD SLM, while permitting the "on" pixel light to pass straight through to the projection lenses. According to this preferred embodiment of the invention, however, no TIR prism is included between DMD 28 and projection lens elements 60, and as such the back focal length (and, accordingly, the diameter of lens elements 60) can be kept short.

Figure 7A:
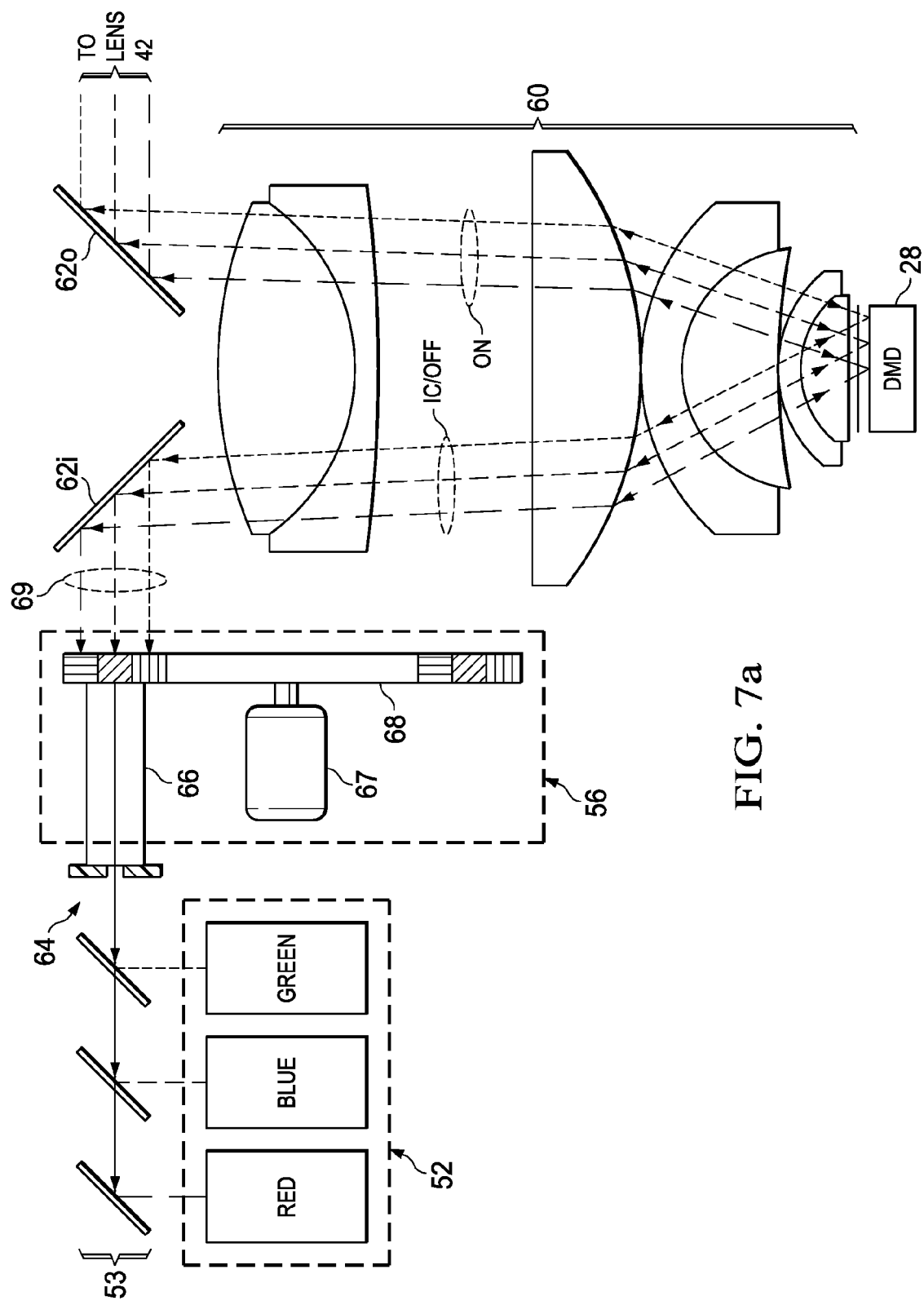
FIG. 7a is a schematic and cross-sectional view of an illumination system and a rear group of projection lens elements according to a first preferred embodiment of the invention.

Of course, provision must be made to direct the illuminating light to DMD 28 without interfering with the "on" pixel light to be projected. FIG. 7*a* illustrates the arrangement of projection lens elements 60 as part of recycling projection lens group 30*a* in combination with mirrors 62*i*, 62*o*, and in combination with an example of a sequential color recapturing light source. In this example, laser array 52 directs separate primary color light (e.g., red, blue, and green light) via mirrors 53 to recycling integrator 56, which includes integrating rod 66 and color wheel 68. Integrating rod 66 includes mirrored aperture 64 at its source end, with the reflective mirrored surface directed toward the exit end of integrating rod 66. Color wheel 68 is rotated by motor 67, and includes dichroic color filters to pass red, blue, and green light simultaneously through separate regions of its exit end; each of these dichroic color filters reflect the non-pass band light back into integrating rod 66. For example, the red dichroic filter portion of color wheel 68 passes red light and reflects light of other wavelengths back into integrating rod 66. The arrangement of the dichroic color filters in color wheel 68 preferably follows a "spiral of Archimedes" geometry, for example as described in the commonly assigned and above-incorporated U.S. Pat. No. 6,642,969, to illuminate DMD 28 with simultaneous lateral "stripes" of light of multiple primary colors. Alternatively, a white or polychromatic lamp may be used in place of laser array 52 and mirrors 53, in which case color wheel 68 would serve to project the multiple primary colors (e.g., red, green, blue) in a scrolling or field-sequential fashion.

Figure 1:
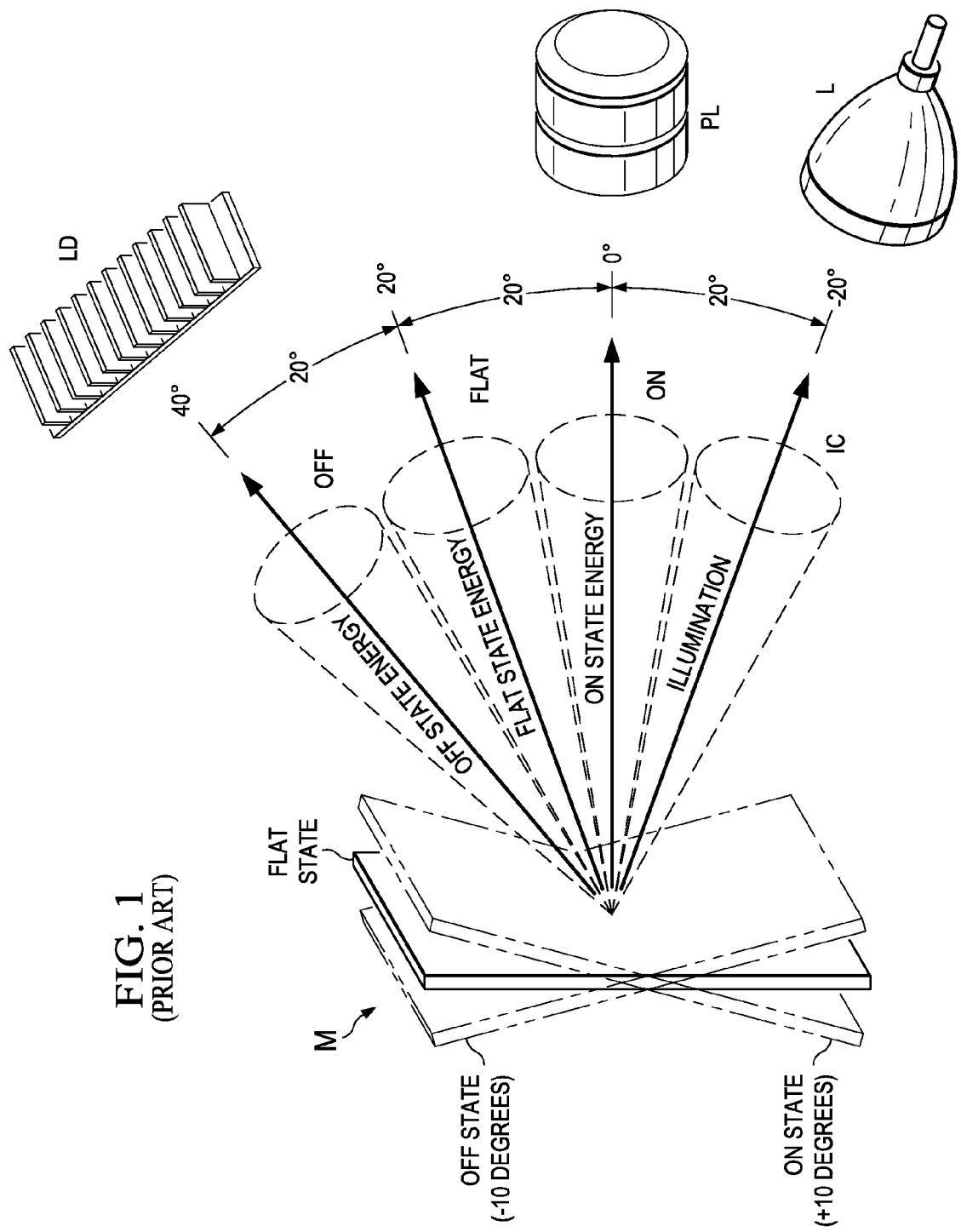
FIG. 1 illustrates the illumination cone and projection pupils in conventional micromirror-based display systems.

In this example, lens 69 images the exiting primary light passed by dichroic color wheel 68 from the output of integrating rod 66, with this imaged light redirected by mirror 62*i* through projection lens elements 60 to DMD 28, as illumination cone IC. Alternatively, mirror 62*i* can be omitted from this light path if the illumination module is positioned so that the optical axis of illumination cone IC from integrating rod 66 is parallel to that of projection lens elements 60. According to this preferred embodiment of the invention, following the description provided above relative to FIG. 6, DMD 28 reflects projection pupil OFF for "off" pixels back along this same path, through projection lens elements 60, reflecting from mirror 62i through lens 69, and into recycling integrator 56. In contrast to the orientation of conventional micromirrors, for example as shown in FIG. 1, the "off" pixel projection pupil OFF corresponds to the light reflected from the micromirrors at their negative (e.g., −10° or −12°) deflection angle. As such, the "off" pixel light, after retro-reflection by DMD 28 itself and via projection lens elements 60 and mirror 62i, is recycled by recycling integrator 56. This "off" pixel light enters the exit end of integrating rod 66, via color wheel 68 (in the case of SCR recycling; for field sequential recycling, as mentioned above, color wheel 68 is absent). In the conventional manner, this recaptured light will reflect from the interior side surfaces of integrating rod, and from mirror 64, until its exit from the exit end of integrating rod 66 through dichroic color filter 68, in the same manner as newly originated light from laser array 52.

On the other hand, the light for "on" pixels is directed by DMD 28 at their positive (e.g., +10° or +12°) deflection angle, into projection pupil ON that is focused and magnified as discussed above by projection lens elements 60. According to the example shown in FIG. 7a, mirror 62o redirects this "on" pixel light projection pupil ON to aspheric projection lens 42. Mirror 62o may "dither" this image light in the manner described above relative to optical actuator 40, according to the SMOOTH PICTURE™ technology developed and available from Texas Instruments Incorporated, if desired. Alternatively, such dithering may be applied by an optical actuator downstream from mirror 62o, or not at all. Still further in the alternative, if DMD 28 is not realized as an array of micromirrors, but rather as a one-dimensional lightvalve, mirror 62o may be realized as a rotating mirror device (such as a scanning mirror or rotating polygonal mirror) to synchronously scan the reflected "on" pixel light and form the displayed image.

In any event, the angular separation obtained according to this preferred embodiment of the invention is extremely wide, especially considering that this separation is attained without a TIR prism. In the example of FIG. 7a, the angular separation attained is about twice the numerical aperture of projection pupils ON, OFF, or about 24° (twice f-number f/2.4). And the location of mirrors 62i, 62o after projection lens elements 60₀ through 60₇ maintains the necessary diameter of these lens elements 60 at a reasonable size, even for a fast numerical aperture of f/0.68 for this lens system.

Figure 7B:
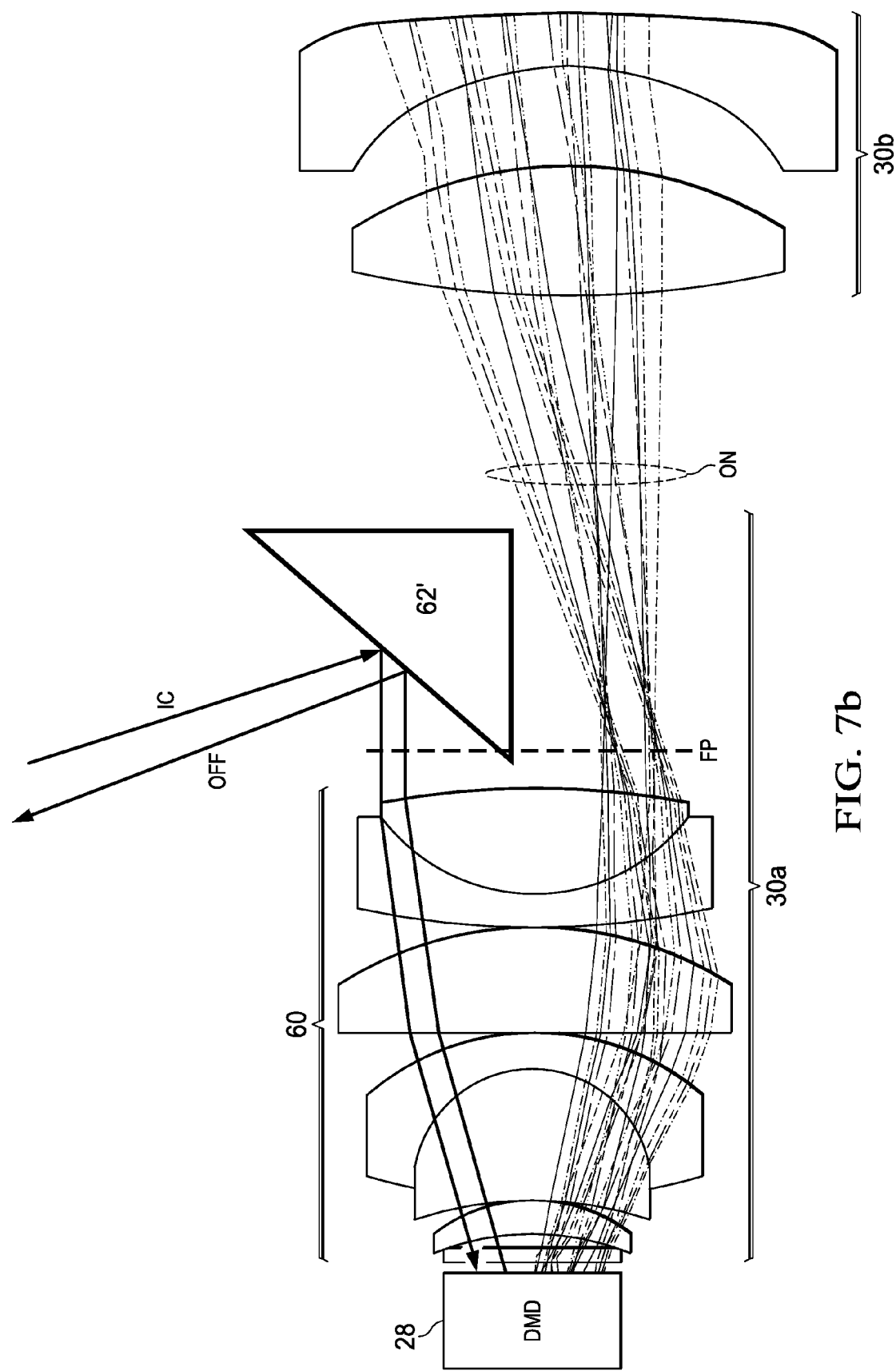
FIG. 7b is a cross-sectional view of the projection lens system according to a second preferred embodiment of the invention.

FIG. 7b illustrates an alternative embodiment of this invention, in which mirror 62o is not present. In this embodiment of the invention, mirror 62' again serves to direct illumination cone IC toward DMD 28 through projection lens elements 60, and also to direct "off" pixel projection pupil OFF back from DMD 28 via projection lens elements 60, as described above. FIG. 7b also illustrates front projection lens group 30b, which receives projection pupil ON for "on" pixel light from projection lens elements 60. As indicated in FIG. 7b, recycling projection lens rear group 30a includes projection lens elements 60, described above, in combination with mirror 62'

According to the embodiments of the invention illustrated in FIGS. 7a and 7b and described above, therefore, the "off" pixel light is redirected by the DMD spatial light modulator, back in effectively the same direction as the illumination light is received, for recycling at the light source. In this embodiment of the invention, the deflection of the micromirrors for "on" and "off" pixel light is effectively swapped from conventional DMD arrangements, such as that illustrated in FIG. 1 and discussed above. This rearrangement of the "off" versus "on" pixel light from the DMD eliminates the requirement for a TIR prism to spatially filter the incoming illumination light from the "on" pixel light to be projected in the image, thus eliminating concern over interference between the two in the displayed image. By eliminating the TIR prism, or more importantly the distance between the DMD and the first projection lens group required for the TIR prism, the projection lens group can be made sufficiently "fast" (i.e., with a sufficiently wide aperture, such as an f-number of f/1.0 or faster) to meet stringent field of view constraints without greatly increasing the necessary diameter of the projection lens elements. In addition, the "off" pixel light can be readily recycled, without the scattering losses and interference that result from redirecting this "off" pixel light through the DMD for a second pass, as in the known "off" pixel light recycling approaches. As a result, recycling of the "off" pixel light can be accomplished, at high efficiency, by a compact form factor arrangement of the DMD and rear projection lens group, and with extremely high optical quality of the rear projection lens group, without substantial added cost in these lens elements.

As will be evident to those skilled in the art having reference to this description, the "on" pixel light from DMD 28 is "off-axis" relative to the projection lens elements 60. As a result, the "on" state projection pupil ON will have a positional translation at the Fourier plane of the rear projection group 30a (i.e., focal plane FP of FIG. 6). This pupil translation of the projected image is readily compensated, or offset, by lateral decentering of the front projection lens group (e.g., aspheric lenses 42, 44 and aspheric mirror 10), according to the preferred embodiment of this invention. For optimal optical quality, it has been discovered, according to this invention, that the "on" pixel projected light appear at the Fourier plane FP without substantial image or pupil aberration. In other words, there should be no aberration resulting from the intermediate space before the front projection lens group that is to be corrected by the front projection lens group before display. This is because the front projection lens group is not readily capable of correcting for image or pupil aberration if a loss of symmetry due to pupil translation is also present, as it is in this case, without substantial and expensive increases in the complexity of the front projection group. Therefore, according to this preferred embodiment of the invention, by ensuring that image or pupil aberration through the rear projection lens group 30a is minimized, front projection lens group 30b can be reasonably implemented by aspheric elements 42, 44, 20, as will now be described.

Figure 8:
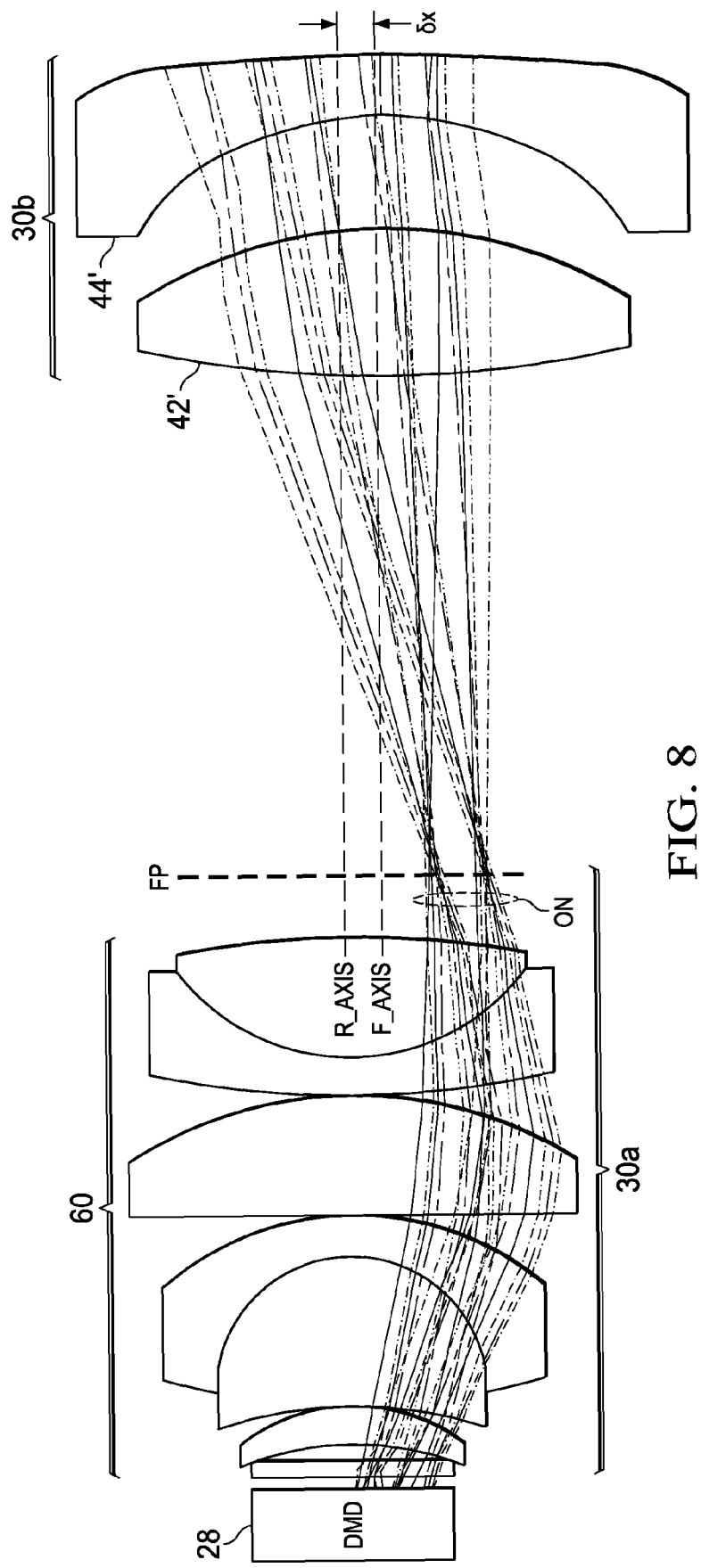
FIG. 8 is a cross-sectional view of the projection lens system according to the preferred embodiments of the invention, illustrating compensation for pupil translation in the rear group of projection lens elements.

It has been discovered, according to this invention, that excellent optical correction can be obtained by a "top/bottom" illumination scheme, by way of which the pupil translation caused by the "off" axis projection of the "on" pixel state light is compensated. FIG. 8 illustrates an example of this arrangement, in the form of an optical (rather than physical) schematic illustration according to the preferred embodiments of the invention. The illumination cone and the "off" state pixel light are not illustrated in FIG. 8. As shown in FIG. 8, projection lens elements 60 in rear group 30a have a common optical axis R_AXIS. However, because the "on" state projection pupil ON is "off-axis" relative to this optical axis R_AXIS, this projection pupil is translated from optical axis R_AXIS at focal (Fourier) plane FP. The arrangement of FIG. 8, according to this preferred embodiment of the invention, compensates for this pupil translation by offsetting the common optical axis F_AXIS of lens elements 42', 44' in front projection lens group 30b by an amount δx, in the same direction as the pupil translation at focal plane FP itself. For example, given the dimensions in the examples described above, for a 0.45" DMD, and rear projection group 30a having an overall length of 71 mm and defining a focal plane FP of about 36 mm in width, an example of offset δx is about 3.41 mm.

Considering this decentering compensation provided by front projection lens group 30b, the preferred embodiments of this invention can therefore utilize the clipped plastic aspheric lenses 42, 44, and clipped plastic aspheric mirror 20, that are used to advantage in reducing the chin and depth of the enclosure for a DMD-based projection display system, such as that described in my copending and commonly assigned U.S. patent application Ser. No. 11/693,343, filed Mar. 29, 2007, incorporated herein by this reference. In this regard, the construction of aspheric lenses 42, 44 and aspheric mirror 20 can follow that described in this above-incorporated U.S. patent application Ser. No. 11/693,343, as may be modified by those skilled in the art having reference to this description and the description in this incorporated U.S. patent application Ser. No. 11/693,343, for their particular implementations and screen sizes. The arrangement of these elements is illustrated in connection with FIGS. 4a through 4c, discussed above.

According to the preferred embodiments of this invention, therefore, several important advantages are provided. First, this invention enables the elimination of the TIR prism previously required to separate the illumination light from the "on" pixel projection pupil, thereby reducing the cost and form factor of the projection lens system. In addition, this invention eliminates the distance between the DMD and the first projection lens group required for the TIR prism, thus enabling the projection lens group to be extremely "fast" (i.e., having a sufficiently wide aperture) without greatly increasing the cost of these optics, because the short distance between the DMD and the first projection lens in turn keeps the necessary required lens diameter modest, even for a numerical aperture of f/1.0 or faster. In addition, this invention provides the capability of recycling and recapturing "off" pixel light, without requiring that this "off" pixel light be redirected through the DMD itself, as such, not only does the recapture of "off" pixel light substantially improve the brightness and efficiency of the illumination system, but according to this invention, this recapture is attained without substantially incurring scattering losses and interference, and the resulting loss of contrast, that is present in conventional recapture systems.

In addition, as described above relative to FIG. 6a in connection with a first preferred embodiment of the invention, if the "on" pixel light from the DMD is "off-axis" (i.e., at a non-zero angle from the normal), the angular separation of "on" and "off" pixel light achieved by the preferred embodiments is very high, as much as twice the f-number of the projection pupils. This increased angular separation reduces the interference and potential for interference between the "on" pixel light and the "off" pixel light. As known in the art, random reflection and diffusion from the backside of the DMD is not strongly dependent on the angle of incidence, but has its energy concentrated at the normal from the DMD surface (e.g., with the reflected energy distribution behaving with the cosine of the angle from the normal, for the case of a Lambertian diffuser). Accordingly, in this off-axis implementation, to the extent that light scattering is present in the system, the coupling of this scattered and back-reflected light to the off-axis "on" pixel light is reduced from conventional systems.

The invention is also compatible with many alternative light recapture technologies, and is also compatible with modern short chin and minimal depth enclosures for DMD-based projection display systems.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A projection display system, comprising:
    a graphics driver, for generating control signals according to a sequence of images to be displayed;
    a light source for producing light of at least one primary color;
    a digital micromirror device for modulating the light of at least one primary color from the light source, such modulating responsive to control signals from the graphics driver, the digital micromirror device comprised of a plurality of deflectable micromirrors for deflecting light in first and second directions responsive to the control signals from the graphics driver, wherein light deflected in the first direction is directed along a return path to the light source;
    projection optics, comprising at least a first lens element positioned near to the digital micromirror device, for receiving light deflected in the second direction by the digital micromirror device;
    a projection mirror, for reflecting light received from the projection optics; and
    a projection screen, positioned to receive the reflected light from the projection mirror.

2. The system of claim 1, further comprising:
    a first reflective mirror surface, for directing light from the light source to the digital micromirror device;
    wherein light deflected in the first direction by the digital micromirror device is reflected by the first reflective mirror surface toward the light source.

3. The system of claim 2, wherein the light directed by the first reflective mirror surface is directed to the digital micromirror device through a portion of the projection optics;
    and wherein the light directed by the digital micromirror device in the first direction is directed to the first reflective mirror surface through the portion of the projection optics.

4. The system of claim 2, wherein the light source further comprises:
    a recycling integrator for receiving light from the light source at an entrance end and receiving return light from the first reflective surface at an exit end, and for emitting light from its exit end toward the first reflective surface.

5. The system of claim 4, further comprising:
    a color filter disposed at the exit end of the recycling integrator, the color filter having a plurality of dichroic color filters, each dichroic color filter for passing light of a selected one of the plurality of primary colors and reflecting light of other colors; and
    a mirror surface disposed at the entrance end of the recycling integrator, for redirecting incident light toward the exit end of the recycling integrator.

6. The system of claim 5, wherein the light source comprises:
    a lamp for producing polychromatic light.

7. The system of claim 5, wherein the light source comprises:
    a plurality of lasers, each for producing light of one of a plurality of primary colors.

8. The system of claim 4, wherein the light source comprises:
a plurality of lasers, each for producing light of one of a plurality of primary colors.

9. The system of claim 8, wherein the recycling integrator comprises:
a plurality of lightpipes, one associated with each of the plurality of lasers, each having an entrance end disposed toward its associated laser, and having an exit end;
a mirror surface disposed at the entrance ends of the plurality of lightpipes, for redirecting incident light toward the exit ends of the plurality of lightpipes.

10. The system of claim 4, wherein the recycling integrator partially diffuses return light received from the first reflective surface at an exit end, prior to emitting that return light from its exit end.

11. The system of claim 2, further comprising:
a second reflective mirror surface, for directing light deflected in the second direction by the digital micromirror device through a portion of the projection optics.

12. The system of claim 1, wherein the projection mirror comprises an aspheric mirror.

13. The system of claim 1, wherein the projection optics comprise:
a rear group of projection lenses, of spherical curvature, for receiving light deflected in the second direction by the digital micromirror device;
a front group of aspheric projection lenses, for receiving light from the rear group of projection lenses and passing that light to the aspheric mirror.

14. The system of claim 13, wherein the light deflected in the second direction by the digital micromirror device defines a projection pupil that is translated relative to an optical axis of the rear group of projection lenses;
and wherein the front group of aspheric projection lenses have an optical axis that is offset from the optical axis of the rear group of projection lenses in the direction of the translation of the projection pupil.

15. The system of claim 14, further comprising:
a first reflective mirror surface, for directing light from the light source to the digital micromirror device; and
a second reflective mirror surface, disposed between the rear group of projection lenses and the front group of projection lenses, for directing light deflected in the second direction by the digital micromirror device through a portion of the projection optics;
wherein light deflected in the first direction by the digital micromirror device is reflected by the first reflective mirror surface toward the light source.

16. The system of claim 13, wherein the rear group of projection lenses has a numerical aperture faster than about f/1.0.

17. A method of recapturing "off" pixel light in a projection display system using a digital micromirror device as a spatial light modulator, comprising the steps of:
illuminating the digital micromirror device with incident light;
operating a plurality of micromirrors in the digital micromirror device to deflect incident light corresponding to "on" pixels in an image to be displayed toward at least one projection lens, and to deflect incident light corresponding to "off" pixels in the image toward a first reflective surface;
receiving light deflected by micromirrors corresponding to "off" pixels, from the first reflective surface, at a light integrator;
illuminating the digital micromirror device with at least some of the light corresponding to "off" pixels received by the light integrator from the first reflective surface; and
displaying, on a screen, an image corresponding to the light corresponding to the "on" pixels.

18. The method of claim 17, wherein the illuminating step illuminates the digital micromirror device with incident light via a first reflective surface;
and further comprising:
reflecting light corresponding to "on" pixels and received from at least one projection lens at a second reflective surface, to direct the reflected light toward a front projection lens.

19. The method of claim 17, wherein the illuminating step illuminates the digital micromirror device with incident light via a first reflective surface and a portion of at least one projection lens;
and wherein the operating step deflects incident light corresponding to "off" pixels toward the first reflective surface through the portion of at least one projection lens.

20. The method of claim 17, wherein the illuminating step comprises:
operating a polychromatic light source; and
directing light from the light source through a plurality of dichroic color filters, each dichroic color filter passing light of a selected one of the plurality of primary colors and reflecting light of other colors.

21. The method of claim 17, wherein the illuminating step comprises:
operating a plurality of lasers in a laser array, each laser producing light of one of a plurality of primary colors.

22. The method of claim 21, further comprising:
passing the light produced by the plurality of lasers through the light integrator; and
directing light from the light integrator toward the digital micromirror device through a plurality of dichroic color filters, each dichroic color filter passing light of a selected one of the plurality of primary colors and reflecting light of other colors.

* * * * *